United States Patent [19]

Rockoff

[11] Patent Number: 5,511,212
[45] Date of Patent: Apr. 23, 1996

[54] MULTI-CLOCK SIMD COMPUTER AND INSTRUCTION-CACHE-ENHANCEMENT THEREOF

[76] Inventor: Todd E. Rockoff, 60 Hillcrest Dr., Eden Hills, Adelaide, Australia, 5050

[21] Appl. No.: 103,013

[22] Filed: Aug. 6, 1993

[30] Foreign Application Priority Data

Jun. 10, 1993 [AU] Australia ................................. PL9292

[51] Int. Cl.$^6$ ........................... G06F 15/00; G06F 15/76; G06F 15/80
[52] U.S. Cl. .................... 395/800; 395/550; 364/DIG. 1; 364/270.7; 364/271.2; 364/DIG. 2
[58] Field of Search ..................................... 395/550, 800

[56] References Cited

U.S. PATENT DOCUMENTS

| | | |
|---|---|---|
| 5,175,858 | 3/1991 | Hammerstrom . |
| 5,210,705 | 5/1993 | Chauvel et al. ........................ 364/572 |
| 5,239,654 | 8/1993 | Ing-Simmons et al. . |
| 5,243,699 | 9/1993 | Nickolls et al. ........................ 395/275 |
| 5,280,474 | 1/1994 | Nickolls et al. . |
| 5,336,939 | 8/1994 | Eitrheim et al. ........................ 307/269 |

OTHER PUBLICATIONS

Tripiccione, R. "A VLSI Chip Set for a Massively Parallel Scientific Processor", 1992.
Fisher, A. L. "System Support for a VLSI SIMD Image Computer" 1988.
Rockoff, Todd E. et al, "A Four–Processor Building Block for SIMD Processor Arrays" 1989.
Miyaguchi et al, "Digital TV With Serial Video Processor" IEEE Transactions on Consumer Electronics.
Flynn, Michael J., "Some Computer Organizations and Their Effectiveness," *IEEE Transactions on Computers*, C–21 (9):948–960 (1972).

*Primary Examiner*—Kevin A. Kriess
*Assistant Examiner*—St. John Courtenay, III
*Attorney, Agent, or Firm*—Townsend and Townsend and Crew

[57] ABSTRACT

This invention relates to Single Instruction-stream Multiple Data-stream (SIMD) computer architecture. A SIMD computer typically comprises one or more single-chip Processing Element (PE) modules, each having one or more PEs and interfaces to multi-chip subsystems (MCSs). The PEs bear the brunt of a SIMD computation's workload, while MCSs provide coordination among PEs.

In one aspect, this invention comprises augmenting the PE module with a multiplicity of clocks so as to regulate each PE and each MCS at its maximum rate of operation. In a further aspect, this invention comprises augmenting the PE modules with the ability to store instruction sequences and to provide repeated instruction sequences at the highest possible rate within the PE module.

A SIMD computer allocates a greatest possible proportion of total chip-area to PEs. As determined by the electrical characteristics of the VLSI-based implementation process, the maximum operation rates of the PEs and MCSs exceed the rate of the global system clock. The invention comprises enhanced SIMD computers that exhibit the highest possible throughput-to-area ratio of any VLSI-based multi-processor.

24 Claims, 8 Drawing Sheets

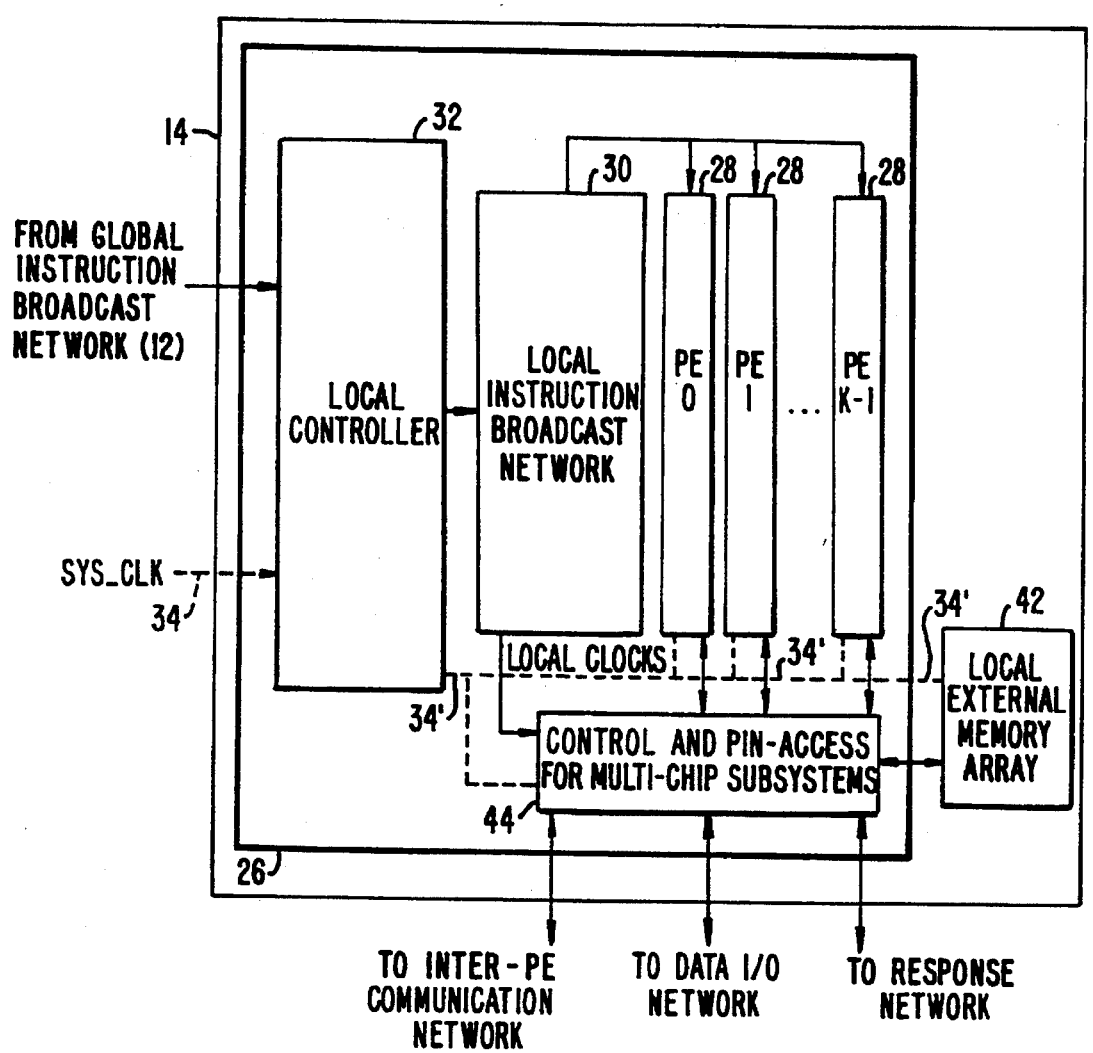
FIG. 2. PRIOR ART
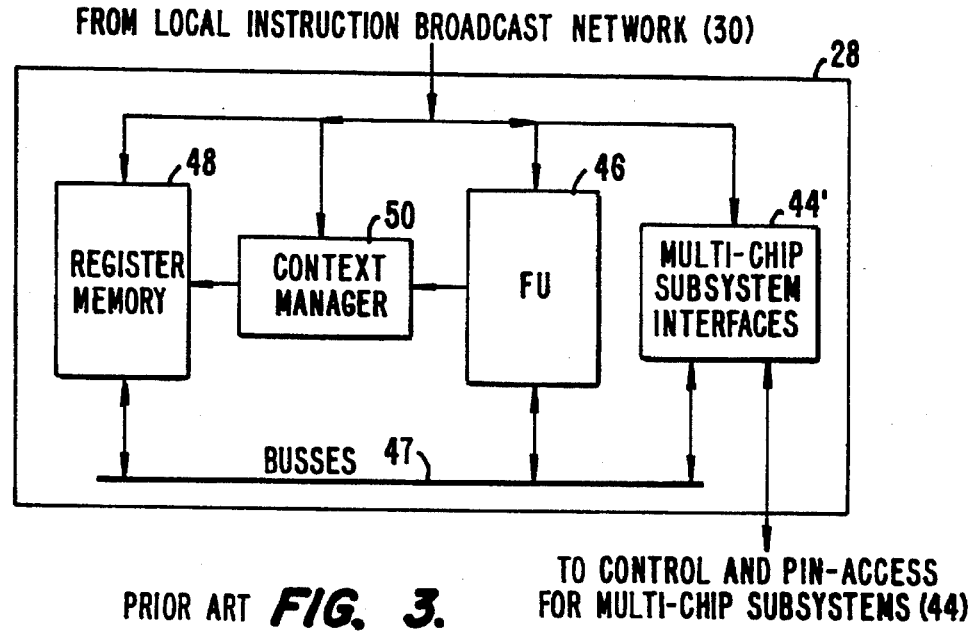
PRIOR ART FIG. 3.

MULTI-CLOCK SIMD COMPUTER AND INSTRUCTION-CACHE-ENHANCEMENT THEREOF

BACKGROUND

To the extent that throughput measures computer performance and total chip-area measures computer cost, the ratio of throughput to area expresses a computer's performance-to-cost ratio. Maximum throughput is often the main objective of computer architecture. Maximum throughput-to-area ratio is a related objective in a world of finite resources: For a given total chip area used in a computer, a higher throughput-to-area ratio implies higher throughput. Equivalently, for a given required throughput, a higher throughput-to-area ratio implies lower total chip-area. Throughput-to-area ratio is especially important in designing computers that will be used for some of those problems demanding the highest possible throughput given a limited implementation budget with respect to total chip-area.

This background discussion presents a sequence of improvements to computer architecture leading from uni-processors to maximum-throughput programmable VLSI-based multiprocessors. Each step in the sequence increases the throughput and/or decreases the cost of the computer. This sequence is meant to be descriptive of one path towards the goal of fast, inexpensive computers, rather than prescriptive of all such paths. The last two steps in this particular sequence are claimed by the inventor. The inventor has established that these last two steps, together, increase considerably the throughput-to-area ratio exhibited by computers solving a broad range of well known and important problems demanding the fastest possible computations.

Typically, a uni-processor contains a variety of computation means, including data storage means for representing variables, calculation means for performing arithmetic operations on those variables in a totally programmable and reprogrammable way, and local control means for specifying the step-by-step operation of the variety of means in a serial manner. Local control means comprises program storage means and program sequencing means. The instructions comprising a uni-processor's controlling program are placed in program storage prior to the outset of the computation. Typically, the instructions contained in the program are applied singly during computation, in a sequence that is determined in part by the values of intermediate computation results. Typically also, a uni-processor is regulated by one system clock, and computation throughput is proportional to the rate of that system clock. The typical diversity of purposes for which a uni-processor is used causes flexibility to be more important than throughput-to-area ratio. In the 1970s, it became possible through integration to place substantial parts of all of the main subsystems of a uni-processor on a single chip. The preferred embodiments of uni-processors have since been microprocessor-based, due to the inherent speed and cost advantages of integration.

Unfortunately, integration alone does not always make computers fast enough, because the electrical characteristics of devices produced in a given chip-making process impose an upper bound on the throughput attainable with a single microprocessor. The need for yet higher throughput motivates the design of parallel computer systems, or multiprocessors, containing large numbers of coordinated and specialized processing elements, or PEs. Typically, each multiprocessor PE may comprise a microprocessor augmented with such inter-PE communication means as are required for the PEs to perform coordinated actions and with such means as required to transfer problem data into and out of the PEs. The most general multiprocessing architecture is known as multiple-instruction stream, multiple-data stream (MIMD), wherein each PE possesses data storage, calculation, and local control means similar to those of a microprocessor, in addition to inter-PE communication means and problem data input and output means.

In commercially realizable form, a MIMD computer comprises a plurality of chips called PE modules, each containing one or more PEs and interfaces to subsystems including inter-PE communication means and problem data input and output means. Each one of a MIMD computer's subsystems belongs to one of two classes: multi-chip subsystems (MCSs) and intra-chip subsystems. MCSs are distinguished from intra-chip subsystems in that each MCS comprises one or more chips and inter-chip wires connecting to at least one PE module. The operation rate of an intra-chip subsystem is not constrained by the typically slow electrical propagation characteristic of inter-chip wires. Typically, MIMD intra-chip subsystems include the data storage, calculation, and local control means individually associated with each PE. In a MIMD computation, the one or more PEs each executes a sequence of intra-chip calculations and transfers selected data to and from MCSs, independently from, but in coordination with, the other PEs. These calculations and transfers are typically regulated by a single system clock, and computation throughput is proportional to the rate of that system clock. While the system clock may be electrically standardized and buffered at each PE module, the system clock represents a single system-wide timing reference.

For some problems, MIMD computer throughput is roughly proportional to the number of PEs. The MIMD PE being an augmented microprocessor-like element, it occupies at least as much chip area as a microprocessor. Therefore, MIMD computer throughput is higher than microprocessor throughput for some problems, although MIMD computer throughput-to-area ratio cannot be appreciably greater than microprocessor throughput-to-area ratio.

Frequently, problems solved by MIMD computations are data-parallel. A data-parallel problem is divisible into a collection of subproblems, each of which is associated with a subset of the problem-defining input data-set. The data subsets associated with disparate sub-problems overlap, and such overlap induces an inter-PE communication requirement when the subproblems have been partitioned among the PEs. How much inter-PE communication is required is proportional to how much the subproblems' data-subsets overlap, and this overlap varies among data-parallel problems. For a given data-parallel problem, choosing a partition that minimizes the amount of required inter-PE communication is important for achieving efficient computation.

Typically, a MIMD computation solving a data-parallel problem is structured as a single program replicated in each and every PE. MIMD computations structured in this way are of sufficient importance to merit designation as a unique class of computation known as single program, multiple-data stream (SPMD) computation. Although SPMD is a specialized method of using a MIMD computer rather than an improvement to the computer itself, SPMD's simplicity in some cases reduces the programming costs associated with computation. SPMD computations are commonly applied in solving demanding data-parallel problems as arise in weather forecasting, nuclear reactor dynamic simulation, pattern recognition, oceanography, seismology, image and signal processing, data compression, data encryption, and specialized mathematical operations on large sets of numbers.

In some SPMD computations, the replicated program executed on every PE progresses in identical sequence on every PE. For such computations, the physically replicated local control means associated with each MIMD PE is redundant. In a single-instruction stream, multiple-data stream (SIMD) computer, the redundant local-control associated with each PE is removed in favor of a single shared control-element called a system controller. (SIMD computation was identified as an alternative to MIMD computation as early as 1972 by Michael J. Flynn, in *Some Computer Organizations and Their Effectiveness,* IEEE Transactions on Computers, C-21(9):948–960, September 1972, at page 954.) The system controller in a genetic SIMD computer consolidates the PE local control that is replicated in a MIMD computer and is redundant in some SPMD computations. The system controller sequences instructions and broadcasts those instructions via a global instruction broadcast network to each of the plurality of PEs. To allow execution of data-dependent programs (programs wherein the sequence of executed instructions depends on values of intermediate computation results), the system controller also receives status information from the PEs via a response network.

In any multiprocessor computation, the PEs collectively perform the majority of the calculations required to produce the result. The inherent advantage of a SIMD computer is that a maximum proportion of the total chip area is used for PE data storage and calculation means, in preference to having fewer PEs each having associated microprocessor-like local control mechanisms. Compared to its MIMD counterparts, a SIMD PE module realized in a given chip area contains at least 2 times, and perhaps but not limited to 5 times, more chip area allocated to PE data-storage and calculation means.

Neglecting physical constraints arising from MCSs' interchip connections and their associated wire delays, it can be assumed that instructions are broadcast to the PEs at the same rate at which a PE can execute them. A SIMD computer thus expectably exhibits maximum throughput-per-area ratio for some problems, by way of maximizing the number of fixed design PEs operating at a given rate on the available chip area.

Despite the apparent inherent advantage of generic SIMD computers, commercial and academic results achieved to date have been disappointing: generic SIMD computers do not exhibit appreciably higher throughput-to-area ratio than similar cost MIMD counterparts. MIMD is currently the commercially favoured architecture for high-throughput programmable multiprocessors. Absent appreciably higher throughput, SIMD is seen as being inferior to MIMD because of the relatively lower programming flexibility resulting from consolidating PE local control into the single SIMD system controller.

BRIEF DESCRIPTION OF THE INVENTION

The inventor has established that the throughput and the throughput-to-area ratio exhibited by existing SIMD computers are lower than neccessary, due to a heretofore unrecognized clock-rate limitation. In a generic SIMD computer, one system clock regulates all subsystems, and the interval of such a system clock must be sufficient to allow the time to broadcast an instruction to the PEs via the global instruction broadcast network. The clock rate limitation arises because the interval of such a system clock is necessarily longer than the minimum possible interval of a clock controlling the PEs. Furthermore, the interval of such a system clock is also longer than the minimum possible intervals of the clocks controlling some of the MCSs other than the instruction broadcast subsystem.

Remedying this newly apparent limitation raises the new subproblem of maximum rate instruction delivery. Because the global instruction broadcast network connects a single source (the system controller) to every PE module, it exhibits the worst case electrical propagation characteristics of any MCS' inter-chip wires. The PEs' highest rate of operation likely exceeds the rate of global instruction broadcast. The solution to the maximum-rate instruction delivery subproblem is to provide instructions to the PEs at their highest rate of operation.

Exploiting a maximum PE operation rate that is higher than the global instruction broadcast rate requires a clock, within the PE module, whose rate exceeds that of the system clock. Thus, a solution to the maximum-rate instruction delivery subproblem in turn raises the further sub-problem of multiple rate operation. The maximum operation rates of the PEs and MCSs are determined principally by VLSI implementation technique and by the electrical propagation characteristics of inter-chip wiring. These physical considerations constrain the highest operation rate of each MCS to lie between the PE operation rate and the global instruction broadcast rate. The solution to the multiple rate operation subproblem is to operate the PEs and each MCS at its highest rate.

The inventor has identified multi-clock enhancement of a generic SIMD computer as a means to solve the multiple rate operation subproblem. The inventor has shown that multi-clock enhancement of a generic SIMD computer, resulting in a multi-clock SIMD computer, increases throughput-to-area ratio. The inventor has also recognized that adding an explicitly managed instruction buffer (SIMD instruction-cache) to the PE modules of a multi-clock SIMD computer is a solution to the maximum rate instruction delivery subproblem. Instruction cache enhancement of a multi-clock SIMD computer further increases throughput-to-area ratio to factors of 2 to 8 or more times that of a generic SIMD computer.

In its broadest aspect, the invention is a multi-clock SIMD computer comprising at least one processing element (PE) module, said PE module implemented within a single chip adapted for use in a SIMD computer, said PE module comprising a plurality of internal subsystems, said PE module being adapted to connect to at least one multi-chip subsystem (MCS), said internal subsystems and MCSs being regulated by clocks, severally and separately each at its own rate, and there being at least two such rates.

In a further aspect of the invention, said multi-clock SIMD computer has a predetermined system clock rate, and said PE module is characterized by one or more said internal subsystems being regulated by a PE module clock oscillating at a rate higher than said predetermined system clock rate.

In a further aspect of the invention, said at least one associated MCS clock oscillates at a rate higher than said predetermined system clock rate but no higher than said PE module clock rate.

In a further aspect of the invention, said PE module further comprises at least one processing element (PE) that is regulated by a clock oscillating at a rate higher than said predetermined system clock rate but no higher than said PE module clock rate.

In a further aspect of the invention, said one or more subsystem clocks is synchronous with said system clock.

In a further aspect of the invention, one or more of said subsystem clocks is restartable with respect to the PE module clock.

In a further aspect of the invention, at least one said subsystem clock is restartable in synchrony with said system clock.

In a further aspect of the invention, said multi-clock SIMD computer further comprises a global instruction broadcast means, comprising a system controller and a global instruction broadcast means, wherein said global instruction broadcast means sequentially issues instructions at said predetermined system clock rate to a first of said PE module internal subsystems which comprises a sub-broadcast-interval instruction sequencer adapted to supply said instructions within the PE module at said PE module clock rate.

In a further aspect of the invention, said first of said PE module internal subsystems further comprises a memory means adapted to store sequences of said instructions.

In a further aspect of the invention, said first of said PE module internal subsystems further comprises a control means adapted to provide addresses and read/write control signals to said memory means as directed by said global broadcast instruction means.

In a further aspect of the invention, one of said instructions issuable by said global instruction broadcast means is adapted to direct said memory means control means to begin storing said instructions issued by said global instruction broadcast means in said memory means at said predetermined system clock rate.

In a further aspect of the invention, one of said instructions issuable by said global instruction broadcast means is adapted to direct said memory means control means to cease storing said instructions issued by said global instruction broadcast means in said memory means.

In a further aspect of the invention, one of said instructions issuable by said global instruction broadcast means is adapted to direct said memory means control means to begin retrieving at said PE module clock rate a sequence of said instructions that is present in said memory means.

In a further aspect of the invention, said one of said instructions issuable by said global instruction broadcast means is further adapted to specify to said memory means control means a predetermined number of said instructions issued by said global instruction broadcast means to be stored in said memory means.

In a further aspect of the invention, said one of said instructions issuable by said global instruction broadcast means is further adapted to delimit said sequence of said instructions issued by said global instruction broadcast means stored in said memory means.

In a further aspect of the invention, said one of said instructions issuable by said global instruction broadcast means is further adapted to specify to said memory means control means a predetermined number of said instructions to be retrieved from said memory means.

In a further aspect of the invention, said one of said instructions issuable by said global instruction broadcast means is further adapted to specify to said memory means control means a predetermined location in said memory means from which to begin retrieving said sequence of said instructions that is present in said memory means.

In a further aspect of the invention, said one of said instructions issuable by said global instruction broadcast means is further adapted to specify to said memory means control means a predetermined number of iterations of said sequence of said instructions.

In a further aspect, the invention comprises a combination of the two preceding aspects.

In a further aspect of the invention, one of said instructions stored in said memory means is adapted to specify to said memory means control means a predetermined location in said memory means from which to begin retrieving a further sequence of said instructions that is present in said memory means.

In a further aspect of the invention, said memory means comprises two access ports and wherein said memory means control means is adapted to concurrently read a first sequence of said instructions from said memory means while writing a second sequence of said instructions in said memory means.

Further permutations and combinations of the aspects of single-port cache-enhancement are possible in the context of two-port cache enhancement.

A prefered embodiment of the invention will now be described, although it will be understood that the invention need not be limited to any one or combination of the following features.

DETAILED DESCRIPTION OF THE FIGURES

In order that the invention may be more clearly understood, reference will now be made to the accompanying drawings, wherein:

FIG. 2 depicts a generic SIMD building block;

FIG. 3 depicts a generic SIMD processing element (PE);

DETAILED DESCRIPTION OF THE INVENTION

The invention comprises enhancements to the generic SIMD computer that increase throughput and throughput-to-area ratio. This detailed description of the invention consists of a definition of a generic SIMD computer, identification of an inherent limitation of the generic SIMD computer, discussion of various methods for remedying that limitation, and finally disclosure of aspects of the invention that, by remedying the inherent limitation, increase throughput and/or throughput-to-area ratio.

To simplify the description of the prior art and the embodiments of the invention, like numerals are used herein for like elements in all the figures.

Generic SIMD Computer

Figure 1:
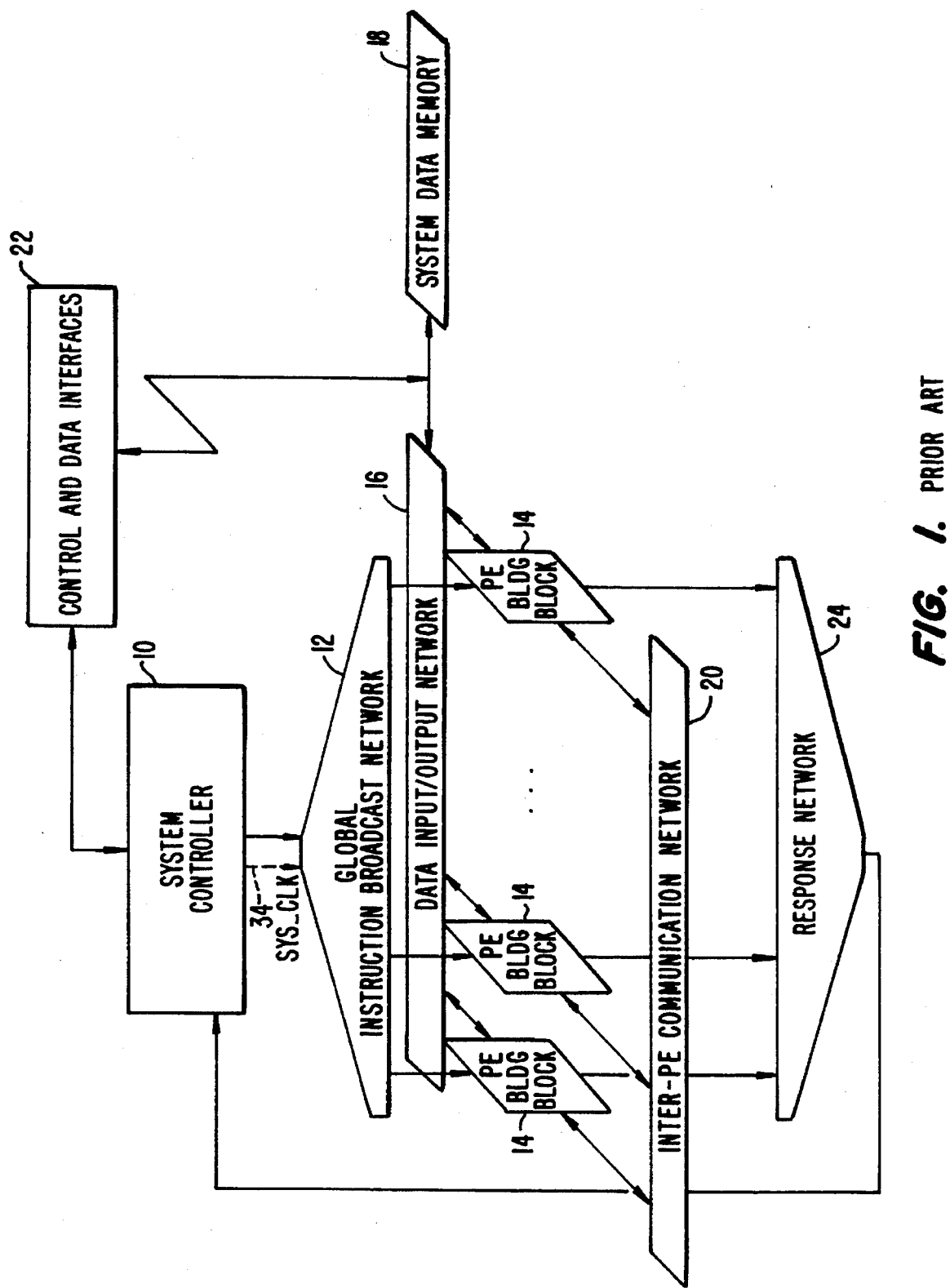
FIG. 1 depicts a generic SIMD computer.

In its generic form, a SIMD computer contains an array of one or more processing elements (or PEs) under the shared control of a single control element, as depicted in FIG. 1, wherein a system controller 10 is associated with an array of PE building blocks 14.

The system controller 10 coordinates the cycle-by-cycle operation of the SIMD computer, in part by generating and broadcasting a system clock 34 that regulates the operation of all clocked elements in the system. The system controller 10 contains uni-processor-like program control means for storing a program and generating a sequence of instructions that are issued to the PEs. On each cycle of the system clock 34, the system controller 10 generates a new instruction, from the set of issuable instructions, that is delivered to the PE building blocks via a global instruction broadcast network 12. The global instruction broadcast network 12, along with a signal driver means in the system controller 10 and signal-receiver means replicated in every PE building block 14, comprises the global instruction broadcast subsystem, one of the subsystems of a generic SIMD computer.

The global instruction broadcast subsystem, and other like subsystems of a generic SIMD computer, typically includes a plurality of chips that are interconnected by inter-chip wires. A subsystem containing a plurality of chips that are interconnected by inter-chip wires is refered to herein as a multi-chip subsystem (or MCS). Other MCSs of the generic SIMD computer depicted in FIG. 1 include the following:

- the response subsystem containing the response network 24 through which PE status information is transmitted to the System Controller 10
- the data input/output subsystem containing the data input/output network 16 through which data is exchanged between the PEs and system data memory 18
- the inter-PE communication subsystem containing the inter-PE communication network 20 through which data is exchanged among PEs FIG. 1 also depicts control and data interfaces 22. A program comprising a sequence of instructions to be executed is provided to the system controller 10 via the control and data interfaces 22. An input data set defining the problem-instance that is to be solved computationally is placed in system data memory 18 via the control and data interfaces 22. Computation is initiated via a signal provided to the system controller 10 via the control and data interfaces 22. Upon the system controller 10 determining that the end of the program has been encountered, an output data set defining the answer that has been obtained computationally is extracted from the system data memory 18 via the control and data interfaces 22.

A genetic SIMD PE building block is depicted in FIG. 2, which is a schematic representation of the PE building block 14 of FIG. 1. This building block comprises a PE module 26, which in this depiction is a single chip but which may also be a specified area of a larger chip, connected to a local external memory array 42 via inter-chip wiring.

The PE module 26 contains a number of identical PEs 28. The PEs 28 are controlled within the PE module 26 by a local controller 32. The local controller 32 coordinates the cycle-by-cycle operation of the PE building block 14, in part by generating and broadcasting a local clock 34' that regulates the operation of all clocked elements within the PE building block 14. Instructions are provided to the PEs 28 from the local controller 32 on every cycle of local clock 34' via a local instruction broadcast network 30. Local clock 34' in a generic SIMD system is typically logically identical to the system clock 34, and every instruction delivered to the PEs via the local instruction broadcast network 30 is typically logically identical to the instruction received by the local controller 32 via the global instruction broadcast network 12.

Access to and from the various MCSs is realized within the PE module 26 as control and pin access 44. The various MCSs for which control and pin access 44 is provided include the inter-PE communication subsystem, the data input/output subsystem, the response subsystem, and the local external memory subsystem, an additional MCS contained entirely within the PE building block 14. The local external memory subsystem is used when the PE data storage requirements exceed the capacity of data storage provided within the PE module 26. The local external memory subsystem comprises the local external memory array 42 of FIG. 2 and inter-chip wires connecting the local external memory array 42 to control and pin-access 44 within the PE module 26.

FIG. 3 depicts schematically the generic SIMD PE 28 of FIG. 2. The PE 28 depicted in FIG. 3 comprises a function unit (FU) 46 for performing data calculations, a register memory 48 for data storage, a context manager 50 for suppressing changes to the stored data in a fully programmable data-dependent manner as specified by instructions received from the local instruction broadcast network 30 of FIG. 2, and multi-chip subsystem interfaces 44' comprising a collection of registers that exchange data with MCSs via the control and pin access 44 of FIGS. 2 and 4. The means of communications within the PE is via one or more busses 47.

Figure 4:
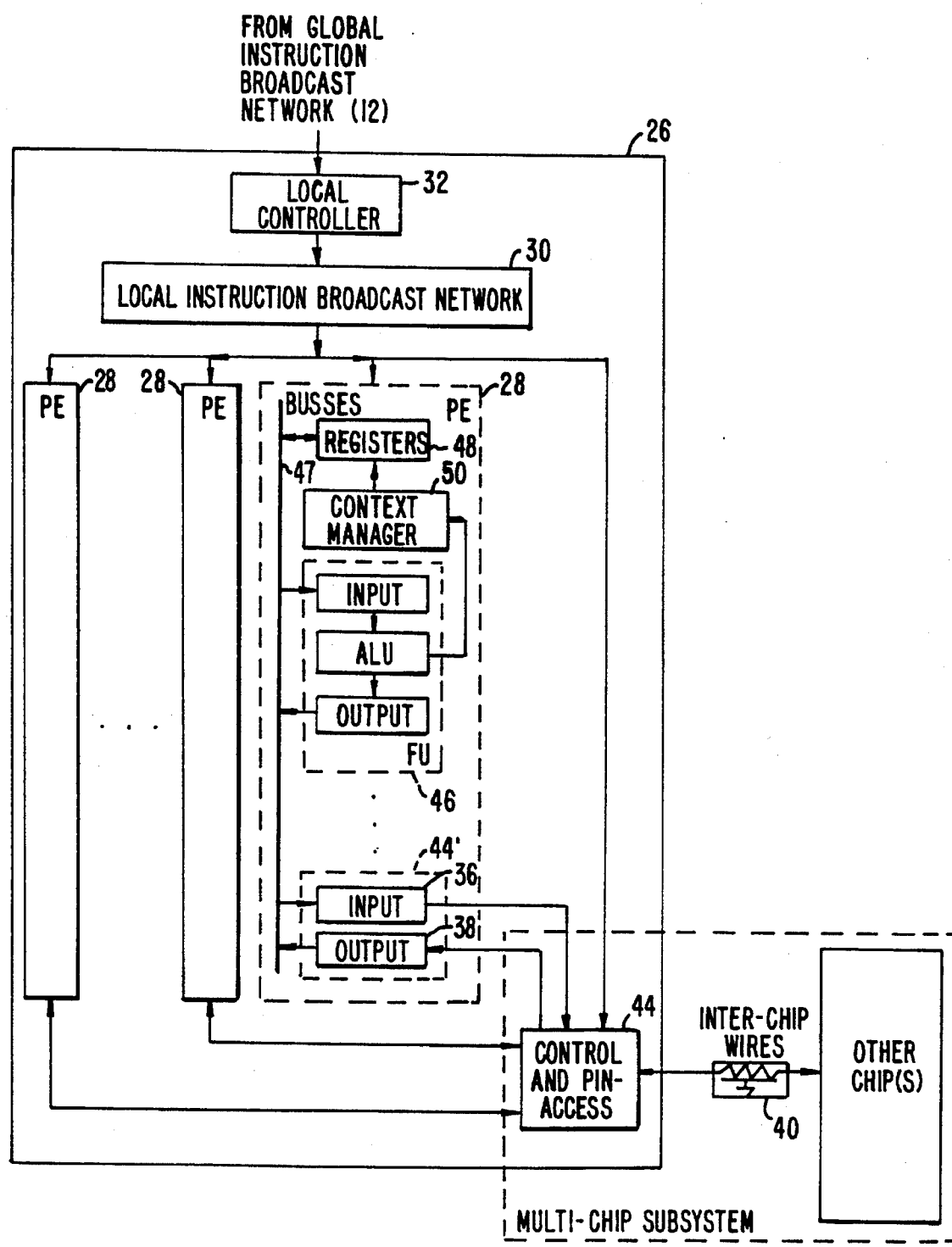
FIG. 4 depicts a generic multi-chip subsystem (MCS)

As depicted in FIG. 4, a genetic MCS comprises a portion of the control and pin access 44 and, importantly, inter-chip wires 40 running between the PE module and at least one remote chip. Due to the switching dynamics of VLSI systems, the electrical propagation characteristics of inter-chip wires 40 are inherently less well suited to fast circuit operation than are those of intra-chip wires, such as those located entirely within the PE module 26.

The genetic MCS of FIG. 4 could be, for example, the local external memory subsystem that comprises in part the local external memory array 42 of FIG. 2. The PE module 26 contains all the genetic elements depicted in FIGS. 2 and 3 including the local controller 32, the plurality of PEs 28 each containing an FU 46, a register memory 48, a context manager 50, and an MCS interface 44'. An MCS interface 44', depicted in FIG. 4, comprises registers input 36 and output 38.

The Clock-rate Limitation of Generic SIMD Computers

As depicted in FIGS. 2 and 4, the single-chip PE module 26 of a generic SIMD computer contains a single local controller 32 that is a control element shared among the PEs. The local controller 32 provides a single sequence of instructions shared among the plurality of PEs 28 co-resident within the PE module 26. The SIMD computer's plurality of local controllers in turn shares a sequence of instructions issued from the system controller 10 via the global instruction broadcast network 12. With respect to the desirability of using available chip area for performing the FU calculations and MCS communications that are the main requirement in solving a demanding computational problem, the control element sharing characteristic of generic SIMD computers is preferable to alternative parallel-processing formulations wherein each PE includes its own control element.

Unfortunately, this control element-sharing also causes a generic SIMD computer to suffer from a heretofore unrecognized clock rate limitation. In the generic SIMD computer depicted in FIG. 1, the single system clock 34 regulates all subsystems. The interval of this system clock 34 must be sufficient to allow the time to broadcast an instruction to the PE building blocks 14 via the global instruction broadcast network 12. The clock rate limitation arises because the interval of the system clock 34 is necessarily longer than the minimum possible interval of a clock controlling the PEs 28 within the PE module 26 within the PE building block 14. Furthermore, the interval of the system clock 34 may also be longer than the minimum possible intervals of the clocks regulating MCSs other than the instruction broadcast subsystem.

Remedying this newly apparent limitation raises the new sub-problem of maximum rate instruction delivery. As depicted in FIG. 1, the global instruction broadcast network 12 connects the system controller 10 to every PE building block 14. Because the global instruction broadcast network 12 connects a single source to every PE module, it exhibits the worst case electrical propagation characteristics of any MCS' inter-chip wires. The PEs' 28 highest rate of operation likely exceeds the rate of global instruction broadcast. The solution to the maximum-rate instruction delivery sub-problem is to provide instructions to the PEs 28 at their highest rate of operation.

Exploiting a maximum PE operation rate that is higher than the global instruction broadcast rate requires a clock, within the PE module 26, whose rate exceeds that of the system clock 34. Thus, a solution to the maximum-rate instruction delivery subproblem in turn raises the further subproblem of operating the PE module at a different rate to that of its associated MCSs. This sub-problem is referred to herein as the multiple rate operation subproblem. The maximum operation rates of a SIMD multiprocessor's PEs 28 and MCSs are determined principally by VLSI implementation technique and by the electrical propagation characteristics of inter-chip wires 40. These physical considerations constrain the highest operation rate of each MCS to lie between the PE operation rate and the global instruction broadcast rate. The solution to the multiple-rate operation subproblem is to design the PE module so that the PEs and MCSs each operates at its highest rate.

Remedying the Clock-rate Limitation

In existing SIMD computers, instructions are delivered from the system controller 10 to the PE building blocks 14 via the global instruction broadcast network 12 in a non-pipelined manner, whereby at most a single instruction is in transit at any given time. One solution to the maximum rate instruction delivery subproblem is to use instead a pipelined global instruction broadcast network 12, so that multiple instructions may be in transit at a time. Special engineering considerations similar to those arising in high clock rate multi-chip supercomputers impinge on the design of such a high-speed global instruction broadcast subsystem. A distinct disadvantage of this solution is that its high engineering cost inhibits resizing and rearranging the global instruction broadcast subsystem as is required in scaling the computer. A further likely disadvantage is that the resulting subsystem may contain an increased number of chips, reducing the throughput-to-area ratio of the computer.

In typical existing SIMD computers, instructions delivered to the local controller 32 via the global instruction broadcast network 12 require a minimum of decoding before they are transmitted to the PEs 28 within the PE module 26. If the PE 28 were capable of operating at a high rate, one way to keep the PE 28 busy for multiple PE module clock cycles upon receipt of a single globally broadcast instruction would be to globally broadcast highly encoded instructions. Such highly encoded instructions, characteristic of a CISC, would require the PE module local controller 32 to comprise a microcontroller, such that each instruction received via the global instruction broadcast network 12 causes a dispatch into a multi-instruction microprogram. Unfortunately, a microprogrammed instruction set introduces unneccessary inflexibility, while the PE module 26 chip-area used to store and to sequence a micro-program might otherwise be used for PEs, thereby also reducing the throughput-to-area ratio of the computer.

A further option for remedying the clock rate limitation is parallel global instruction broadcasting, wherein each PE module 26 would contain a large number of pins, and the local controller 32 would contain a parallel-to-serial shifter to supply instructions on individual PE module clock cycles within the PE module. Unfortunately, the parallel-to-serial shifter and the PE module pins themselves occupy chip-area that might otherwise be used for PEs themselves. Furthermore, beyond a certain number of pins per chip, pins become expensive. These physical and practical constraints inhibit both the simultaneous and parallel conveyance of instructions to the PE module chip as well as the necessary signal access within the chip.

A further option is that of using alternative high-speed VLSI technologies in combination. For example, an ECL-based global instruction broadcast network might be used to broadcast instructions to CMOS PE modules. This apparent option ignores the applicability of the same high-speed VLSI technology to the PE module itself, thus ensuring in the inventor's arrangement that the PEs maximum operation rate exceeds the maximum global instruction broadcast rate in any case.

Particularization of Generic SIMD Computer

The invention comprises in one embodiment a SIMD computer in which multiple clocks are used to regulate various system elements. For example, the global instruction broadcast rate is expectably less than the maximum rate of operation within the PE modules of the PEs and of the associated local controller. Furthermore, the global instruction broadcast rate may be less than or equal to the maximum rate of operation of various non-instruction-broadcast MCSs. In an ideal embodiment, rates of element operation are commensurate with those that are allowable by the particular VLSI-based implementation of the PE module and the remainder of the chips in the SIMD computer.

Figure 5:
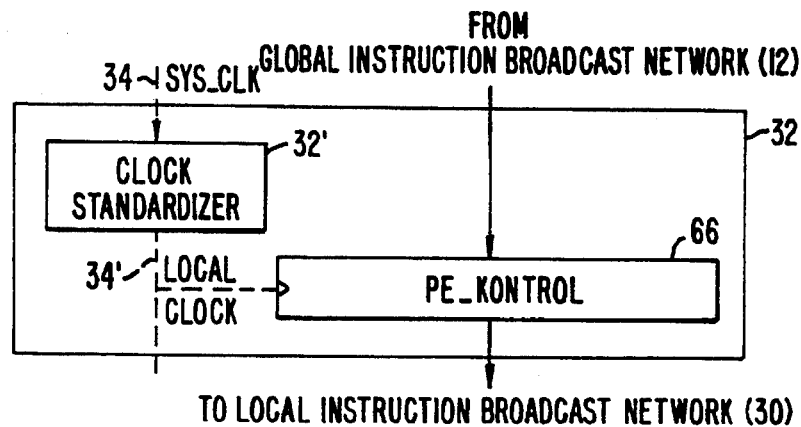
FIG. 5 depicts a particularization of a local controller of a generic SIMD PE module.

FIG. 5 depicts a particularization of the local controller 32 of the SIMD computer PE module 26 depicted in FIGS. 2 and 4. In this particularization, the local controller contains a clock standardizer 32', deriving local clock 34' within the PE module from system clock 34, and an instruction register, pe_kontrol 66. On every cycle of local clock 34', pe_kontrol latches the instruction most recently issued by the system controller 10 via the global instruction broadcast network 12 depicted in FIG. 1, for use within the PE module as indicated in FIG. 2.

Multi-clock SIMD Computer

A multi-clock SIMD computer may be implemented using a set of modifications to a genetic SIMD computer and may be further enhanced by using instruction cache associated with the PE module's local controller. Instruction cache-enhancements are described by way of example in greater detail later in the specification.

In one embodiment of a multi-clock SIMD computer, the local controller and the PEs of a SIMD computer within the PE module share a common maximum rate of operation. However, it is possible in other embodiments, for the maximum rate of operation of the local controller to exceed that of the PEs.

Figure 6:
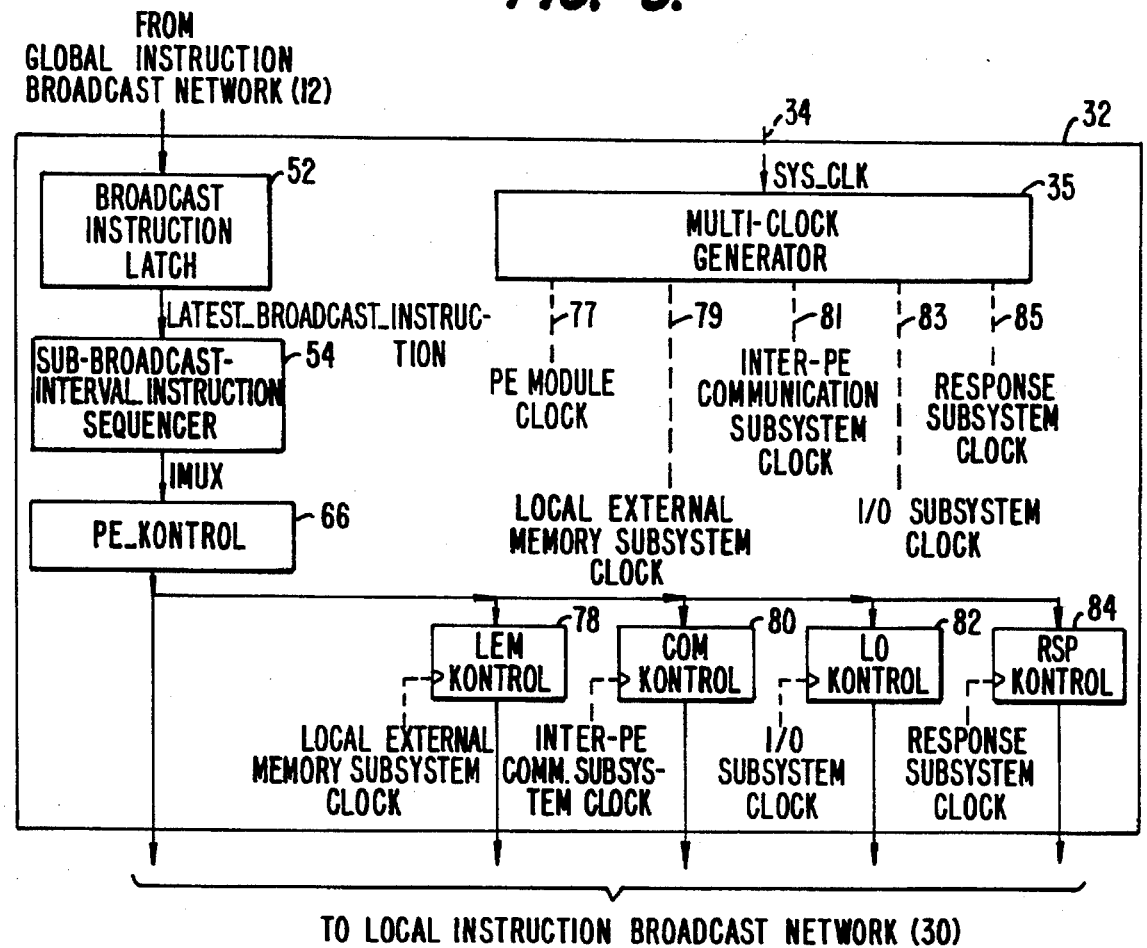
FIG. 6 depicts a particularization of a PE module local controller adapted for a multi-clock SIMD computer.

FIG. 6 depicts in block diagram form an embodiment of a particularization of a local controller 32 adapted to the requirements of a multi-clock SIMD computer. The multi-clock local controller receives system clock 34 as supplied from the system controller 10 via the global instruction broadcast network 12 and issues instructions to the local instruction broadcast network 30, consistent with the representation in FIG. 2.

In a multi-clock PE module, it is preferable that each MCS has its own clock running at its own maximum operation rate; however, subsets of those clocks may be unified. For example, when both the data input/output subsystem and the response subsystem operate at the rate of global instruction broadcast, their clocks operate in unison with the system clock 34 as per the generic SIMD system described previously. As a further example of a multi-clock PE module arrangement, when both the local external memory subsystem and the inter-PE communication subsystem operate at the same rate as the internal PE module components, their clocks operate in unison with the PE module clock. In any event, the local controller, the PEs, and the MCSs are all severally and/or separately regulated to operate at predetermined rates, these rates being determined by the electrical characteristics of the implementation technology and by the topological characteristics of inter-chip wires.

In this particular embodiment six clocks are used, the system clock 34 which regulates the instruction broadcast network and (for simplicity) the system controller; the PE module clock 77; the local external memory subsystem clock 79; the inter-PE communication subsystem clock 81; the system data memory subsystem clock 83 and the response subsystem clock 85.

The system clock 34 regulates global instruction broadcasts. The PE module clock 77 regulates activities entirely internal to the PE module. The PE module clock 77 is synchronized to the system clock 34. The MCS clocks (79, 81, 83, and 85) are also synchronized to the system clock 34. The PE module clock 77 is the fastest clock in this embodiment and, for simplicity in this embodiment, all other clock rates are integer sub-multiples of the PE module clock rate. However, it is also possible for the MCS clocks to be restartable on arbitrary cycles of the PE module clock 77, or for the PE module clock 77 to be stoppable and restartable under control of globally broadcast instructions.

The multi-clock generator 35 shown in FIG. 6 generates the 5 clocks 77, 79, 81, 83, and 85. In this embodiment, phase-locked loop (PLL) techniques provide a suitable implementation in commercial VLSI systems for the multi-clock generator design.

Because there may exist a plurality of clock rates, and because the number of clock cycles required by an MCS to perform an operation is dependent on the particular operation performed, an MCS operation may conclude on an arbitrary one of the multiple PE module clock cycles which occur between successive system clock cycles. Therefore, in a multi-clock SIMD computer, the format of instructions issuable by the global instruction broadcast subsystem may be adapted to be able to specify the index of the PE module clock cycle on which an MCS operation completes.

A multi-clock SIMD PE module incorporates the following changes to a genetic SIMD PE module:

1. The PE module clock 77 is the fastest PE module clock, which oscillates at the maximum rate permitted by the VLSI implementation of the PE module 26.

2. Separate clocks are provided for each MCS.

3. Control words are provided for each MCS. The control word for each MCS is latched in a register also regulated by the clock regulating the MCS. The local controller 32 coordinates the separately clocked MCS via these control words.

4. A broadcast instruction latch 52 may be included in the local controller 32 of the PE module 26 for retiming the incoming globally broadcast instruction to the PE module clock 77 time-base.

5. A new (small) instruction field, delayed_instruction_delay_count 57 (refer to FIG. 7), is added to the globally broadcast instruction format. If a globally broadcast instruction specifies a high-latency MCS operation that completes during the current instruction broadcast interval and before the next globally broadcast instruction arrives at the PE module, delayed_instruction_delay_count 57 specifies the index of the PE module clock cycle on which the MCS operation completes.

6. A sub-broadcast-interval instruction sequencer 54 (refer to FIG. 6) provides an instruction latched into pe_kontrol 66 and distributed via the local instruction broadcast network 30 (also refer to FIG. 4) on each cycle of the PE module clock 77. When a new globally broadcast instruction arrives at the PE module, the sub-broadcast interval instruction sequencer 54 provides a copy of that instruction on its output. During PE clock cycles on which no useful instruction is available, the sub-broadcast-interval instruction sequencer 54 provides explicit NOOPs to the PEs. Also, the sub-broadcast interval instruction sequencer 54 delays terminating instructions for high-latency MCS operations as specified by the delayed_instruction_delay_count 57 field of a globally broadcast instruction.

Figure 7:
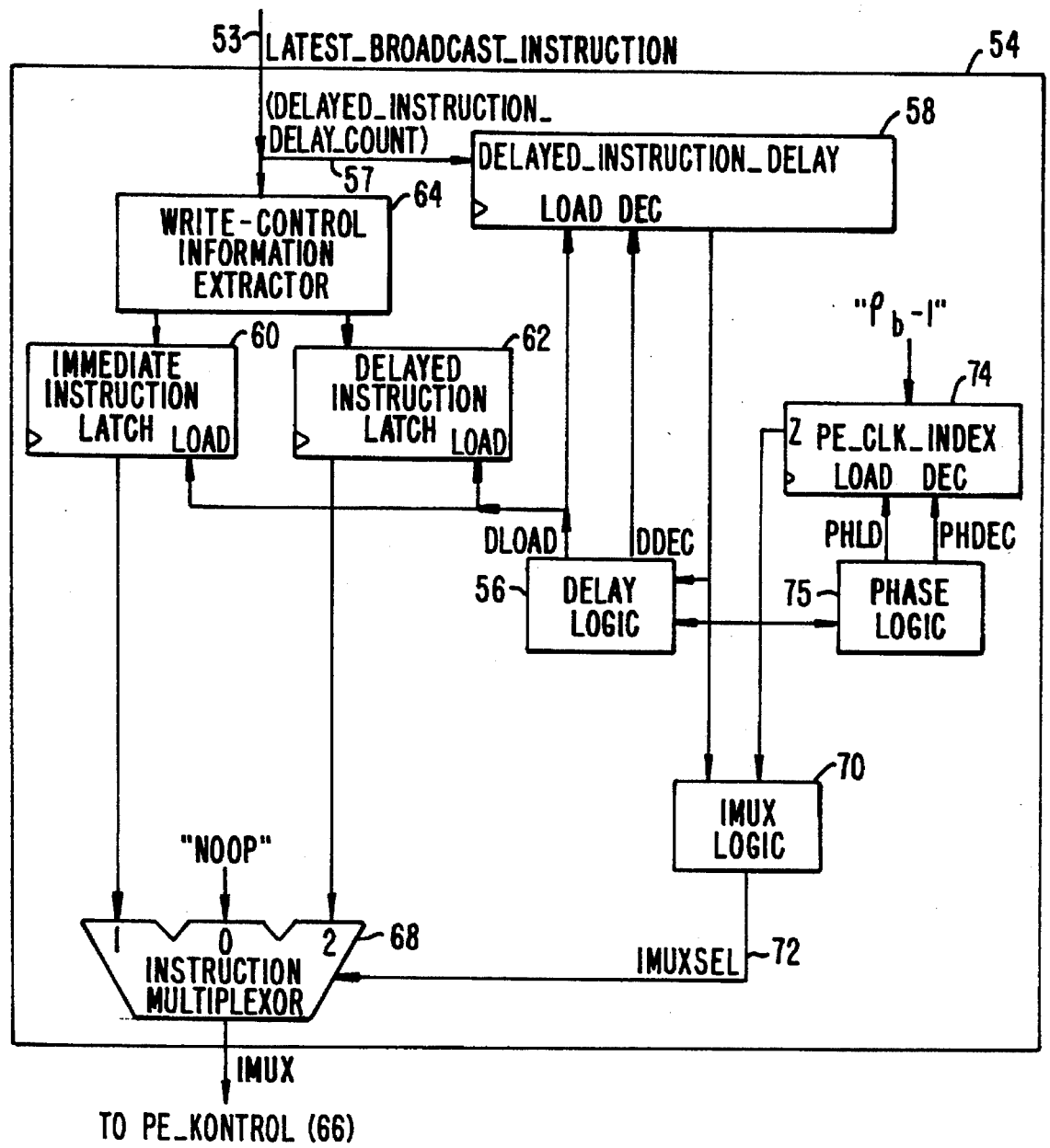
FIG. 7 depicts a sub-broadcast-interval instruction sequencer for a local controller for a multi-clock SIMD computer.

Refering now to FIG. 7, there is a predetermined number of PE module clock cycles per system clock cycle. Let $\rho_b$ represent this number. $\rho_b$ is the ratio of the system clock interval to the PE module clock interval. The PE_CLK_index down-counter 74 associates a unique sub-broadcast-interval index with each PE module clock cycle. In conjunction with its controlling logic PHASE Logic 75, PE_CLK_index is a modulo-$\rho_b$ down counter.

Referring to FIG. 6, the broadcast instruction latch 52 re-times the global broadcast instruction for use within the PE module. The sub-broadcast interval instruction sequencer 54 selects the next PE module clock cycle's instruction, and that instruction is either the most recently received globally broadcast instruction, an explicit null instruction provided because no useful instruction is available on that PE module clock cycle, or an instruction required for a completion of a high-latency MCS operation.

A detailed functional block diagram of a multi-clock SIMD local controller's sub-broadcast interval instruction sequencer 54 is shown in FIG. 7. Referring to FIG. 7, the logic block denoted delay Logic 56 controls the delayed_instruction_delay down-counter 58, the immediate instruction latch 60, and the delayed instruction latch 62. These elements are used to provide received instructions on appropriate cycles of the PE clock. The output value of the delayed_instruction_delay down-counter 58 is constrained so that delayed_instruction_delay can never be zero when the value of PE_CLK_index 74 is also zero. The write-control information extractor 64 is a demultiplexor that shunts fields of the most recently received globally broadcast instruction (latest_broadcast_instruction 53) to corresponding fields in either the immediate instruction latch 60 or the delayed instruction latch 62. The delayed instruction latch 62 receives write-control information such as is needed to cause to be committed to register memory 48 the result of a high-latency MCS operation. A nonnegative value in the delayed_instruction_delay down-counter 58 represents the number of PE module clock cycles until the write-control information contained in the delayed instruction latch 62 is to be provided to pe_kontrol 66. As depicted in FIG. 7 the output of the sub-broadcast interval instruction sequencer 54 is selected through the instruction multipexor 68, from which it is latched into to the pe_kontrol register 66 on each cycle of PE module clock 77.

The logic block denoted imux Logic 70 in FIG. 7 controls the operation of the instruction multiplexor 68. The following table describes the function used to generate the output signal imuxsel 72 which is applied to the control input of instruction multiplexor 68, where X is any value:

| PE_CLK_index | delayed_instruction_delay | imuxsel |
|---|---|---|
| X | 0 | 2 |
| 0 | X | 1 |
| not 0 | not 0 | 0 |

The write-control information extractor 64 shown in FIG. 7 controls the routing of fields from the most recently received broadcast instruction (latest_broadcast_instruction 53) to corresponding fields in the immediate instruction latch 60 and the delayed instruction latch 62. When an instruction specifies completion of an MCS operation whose result is to be placed in register memory 48, the PE write-control information is stored in the delayed instruction latch 62 for subsequent application on the appropriate PE module clock cycle, and the corresponding PE write-control in the immediate instruction latch 60 is assigned null values. The PE module clock cycle on which the content of the delayed instruction latch 39 is selected as the output of the instruction multiplexor 68 to be applied to the pe_kontrol register 66 is, as indicated, stored in the delayed instruction down counter 58.

Referring to FIG. 6, the control words output by pe_kontrol 66 representing the control bits for various MCSs are lem_kontrol 78, com_kontrol 80, io_kontrol 82 and rsp_kontrol 84. These control words are required to initiate activity on the the various MCSs, for which in this embodiment control and pin-access 44 is provided within the PE module 26. A new value is latched into each of these control words on each cycle of the corresponding MCS clock.

The generation and use of multiple clocks allows these control words to be issued at their highest rates, thus resulting in increased throughput. Depending upon the chip area occupied by the multi-clock generator 35 as well as upon the degree by which throughput is increased, multi-clock SIMD exhibits higher throughput-to-area ratio than its generic SIMD counterpart.

Instruction cached SIMD Computer

Many desirable objectives are acheivable from multi-clock- and instruction-cache enhancement of a SIMD computer. Multi-clock enhancement allows the computer's subsystems each to operate at its maximum rate. Of particular interest are the PEs, whose maximum operation rate expectably exceeds the rate of global instruction broadcast. Instruction-cache enhancement increases the execution rate of repeated instruction sequences by eliminating the rebroadcast of those sequences from the system controller. Instead, repeated instruction sequences are supplied from a repository within the PE module at a rate higher than that of global instruction broadcast, thereby potentially increasing throughput. Instruction cache enhancement causes throughput to be less dependent on the rate of global instruction broadcast, thereby creating an opportunity to simplify the global instruction broadcast subsystem design.

In a generic SIMD computer, a single system clock regulates all elements of the computer. Therefore, the PE in a generic SIMD computer is regulated by the same clock that regulates global instruction broadcast. The PE module local controller serves no essential logical function in a genetic SIMD computer, but rather serves the purpose of standardizing the system clock and global broadcast instructions for use within the PE module, as is convenient in constructing any multiprocessor that contains a large number of independently fabricated components.

The system controller maintains the principal control sequence of the program executing on a SIMD computer. An instruction-cache-enhanced SIMD computer contains a local controller which is not always retrieving a previously stored sequence of instructions from its cache memory; when the instructions to be executed are not present in cache, the local controller is locked to the issued sequence of globally broadcast instructions. Any activity that occurs within the PE module while the local controller is locked, occurs at the global instruction broadcast rate. When the local controller is locked, either the PEs idle or they execute whatever PE instructions are broadcast from the system controller. In any event, the local controller itself operates continually under control of globally broadcast instructions. In an instruction-cache-enhanced multi-clock SIMD computer, when a cache block has been stored in the cache, the system controller is able to activate the cache block by broadcasting an instruction directing the local controller to begin executing that cache block. When cache block execution begins, the cache controller sequences through the cache block at the PE module clock rate. When cache block execution terminates, the local controller re-locks to the global instruction broadcast stream.

A program counter in the cache controller advances at a rate different from that of one in the system controller. Since the relative rates of advance are fixed and known statically, it is possible for the system controller to maintain an accurate model of the state of the cache controller. This model is used in system controller cache management.

Several detailed implementations of the cache-enhanced multi-clock local controller are possible. The following description enumerates some of the elements depicted in FIG. 8:

1. Multi-Clock Generator

The multi-clock generator generates multiple high-rate subsystem clocks as required.

2. Cache Memory

The cache memory 86 may comprise an array of memory cells arranged to have one or more access ports.

3. Cache Controller

The cache controller 88 is interposed between the global instruction broadcast network 12 and the local instruction broadcast network 30 within the PE module 26. The cache controller 88 selects the source of the instruction driven onto the local instruction broadcast network 30 on every PE module clock cycle. The cache controller 88 also manages the control inputs to the cache memory 86, and so contains a program counter providing a cache memory address.

4. Cache-control Protocol

The global instruction broadcast stream now includes cache-control instructions in addition to the usual PE instructions. The cache-control instructions follow a cache-control protocol to store cache blocks and to activate them. Each cache design specifies a cache-control protocol.

There are many possible ways to denote the cache locations occupied by a cache block. For example, a cache block may be delimited by markers in the cache; alternatively, a cache block may be delimited dynamically upon activation. Loops may or may not be unrolled when cached, subject to the details of a given cache design. A cache block does not necessarily correspond to an entire loop or subroutine body appearing in a program; it is sometimes profitable to cache sub-sequences of program bodies. A particular cache design may allow multiple entries or multiple exits for a given cache block, to facilitate a compact representation.

A cache control instruction arriving via the global instruction broadcast network alerts the local controller to begin storing a cache block at a specified cache memory address. This instruction may also specify the length of that cache block, or alternatively the end may be indicated by a cache control instruction transmitted at the end of the cache block.

A cache block is activated with a call specifying the parameters required for its execution, possibly including initial and final cache addresses and iteration count. Some cache designs provide mechanisms allowing cache blocks to activate one another, or to nest in cache, with varying degrees of generality.

5. System Controller Cache Management

Control of which cache blocks to place where in the cache, as well as when to put them there and when to activate them, is explicit in the global instruction broadcast stream. If control decisions are to be made in the system controller during the course of a computation, then the system controller may require a potentially complex cache-management mechanism.

A SIMD Instruction Cache Taxonomy

Cache design can be characterized by values for each of the following four major parameters (some important design values, including the total number of cache memory locations, do not appear in this list):

Number of ports.

The cache memory may have one port or two ports. With a two-ported cache memory, instructions for the PEs are retrieved through one port while the other port is used concurrently to pre-store, or prefetch, instructions that will subsequently be needed. Prefetching is an efficient use of the global instruction broadcast network, which is otherwise idle when a cache block has been activated. Prefetching into a SIMD instruction-cache is of maximum benefit when the control flow of the program is statically predictable.

Number of cache blocks.

A cache might be able to contain only a single cache block (of variable length up to some maximum) at a time. A more complicated cache is able to contain a larger number of co-resident cache blocks.

Iteration of cache blocks.

A cache controller might be able to execute only a single pass of an activated cache block. A more complicated cache controller is capable executing a broadcast-instruction-specified number of iterations of a cache block from a single activation.

Nesting of cache blocks.

A cache controller may be capable of interpreting cached instructions that initiate execution of other cache blocks. A cache controller capable of nesting cache blocks requires a control stack similar to that in the system controller sequencer subsystem.

This simple taxonomy yields several distinct classes of cache design. It does not yield 16 because some of the parameters are not mutually independent. For example, it is not possible to nest cache blocks in a single-routine cache.

A Family of Single-port SIMD Instruction Caches

The F-family is a set of related cache designs. An F-family cache memory has one port, so prefetching blocks is not possible for an F-family cache. A member of the family is designated $F_{xyz}$, where each digit of the subscript is either 0 or 1, with the following interpretations:

x 0 indicates no nesting of cache blocks, while 1 indicates possible nesting of cache blocks.
y 0 indicates no iteration of cache blocks, while 1 indicates possible iteration of cache blocks.
z 0 indicates that the cache memory contains at most a single cache block at any one time, while 1 indicates multiple cache blocks may be co-resident in cache memory.

The ends of cache blocks in F-family caches are delimited with sentinels, such that the length of a cache block is not specified in the block's activation.

$F_{000}$ $F_{000}$ is a "one-block, one-shot" cache. $F_{000}$ is the simplest F-family cache. A cache-control instruction activating an $F_{000}$ cache block supplies no parameters, because there is only one possible starting address, the ending address is delimited explicitly in cache, and the iteration count is 1.

$F_{001}$ $F_{001}$ is a "multi-block, one-shot" cache. The questions relating to where to place each cache block are germaine for an $F_{001}$ cache, giving rise to the myriad of re-placement algorithm issues that have been studied in a context of caches and of virtual memory management. A cache control instruction activating an $F_{001}$ cache block supplies a single parameter specifying the starting address of the cache block.

$F_{010}$ $F_{010}$ is a "one-block, multi-shot" cache. A cache control instruction activating an $F_{010}$ cache block supplies a single parameter specifying the number of iterations of the cache block to be performed.

$F_{011}$ $F_{011}$ is a "multi-block, multi-shot" cache. A cache control instruction activating an $F_{011}$ cache block supplies two parameters, the first specifying the starting address and the second specifying the number of iterations of the cache block to be performed.

$F_{100}$ $F_{100}$ would be a cache containing a single block where nesting is allowed. $F_{100}$ cannot be different to $F_{000}$.

$F_{101}$ $F_{101}$ is a "nested multi-block, one-shot" cache. $F_{101}$ is similar to $F_{001}$, with the additional capability for cache blocks to activate one another.

$F_{110}$ $F_{110}$ would be a cache containing a single block where nesting and iteration are both allowed. $F_{110}$ cannot be different to $F_{010}$.

$F_{111}$ $F_{111}$ is the most complex member of the F-family. An $F_{111}$ local controller contains a scaled-down replica of the system controller's program-control components. Since an entire program could be stored in an $F_{111}$ cache, an $F_{111}$ PE module becomes a mini-SIMD computer in its own right. $F_{111}$ may be -continued > regarded as "tightly synchronized MSIMD", wherein the local controllers could concievably progress through different paths through the program in cache. An $F_{111}$ cache would resemble existing MIMDs executing lock-step SPMD code, having a slow broadcast channel for storing programs into the PEs. It may yet be the case even for an $F_{111}$ cache that data-dependent global sequencing decisions and literal calculations are most efficiently performed on the system controller.

The F-family itself covers a large design space. For simplicity, the subsequent discussion of embodiments is restricted mainly to $F_{000}$ and to $F_{010}$ caches.

Static Instruction-cache Management

A SIMD instruction cache is an explicitly managed PE module instruction buffer. Explicit management differs from the implicit management characteristic of typical uniprocessor instruction cache. Under implicit instruction cache management, instructions are saved in cache when they are first referenced and retrieved from cache opportunistically on subsequently repeated references. The presence of an implicitly managed instruction cache is not evident in the program executed on the computer. By contrast, under explicit instruction cache management, a special set of instructions is used to direct the storing of instructions in cache and their subsequent execution. Explicit management necessitates modifying the program to include the required cache-control instructions.

A SIMD instruction cache is managed either statically, by a programmer or compiler, or dynamically, by a cache management algorithm running on the system controller. Static cache management occurs, for example, through modifying the assembly language program describing the computation. Static management of cache is reminiscent of the segment overlay instructions used in programming some early computers. Modification of compilers to increase the efficiency of uniprocessor caches has been reported in the literature.

Whether the cache is managed statically or dynamically, and however complex the cache mechanism itself, there is a single set of cache management sub-problems that are solved in all cases. These subproblems are:

identifying the cachable instruction sequences, determining which sequences will be stored in cache, determining where in cache to put cache blocks, scheduling cache blocks appropriately, directing the storing of the scheduled cache blocks in cache prior to their use, and instructing the local controller to execute the cache blocks at the appropriate points in the computation.

Program transformations are applied during the computation under dynamic cache management, whereas they are applied beforehand under static cache management. Despite this difference, the same modifications are performed in both cases.

Embodiments of $F_{000}$ and $F_{010}$

In uni-processor and MIMD multiprocessor computation, the presence of instruction cache changes only the physical structure of the computation and typically does not affect the operational structure of such computations, in the sense that a sequence of instruction memory references used in the programming of such processors is independent of the presence of an instruction cache. The presence of such a cache reduces the time required to perform some of the individual instruction memory references, but typical instruction caching does not alter the appearance of an assembly language program for the subject system, nor does it substantially change the nature of the architecture of the processor.

By contrast, SIMD instruction cache enhancement as proposed by the inventor requires changing the operational structure of a subject computation, because the sequence of globally broadcast instructions is rearranged and interspersed with cache control instructions to store blocks in cache and to subsequently execute them. SIMD instruction caching alters the appearance of an assembly language program for the subject system and also comprises a substantial change to the architecture of the PE module used in a SIMD computer.

Figure 8:
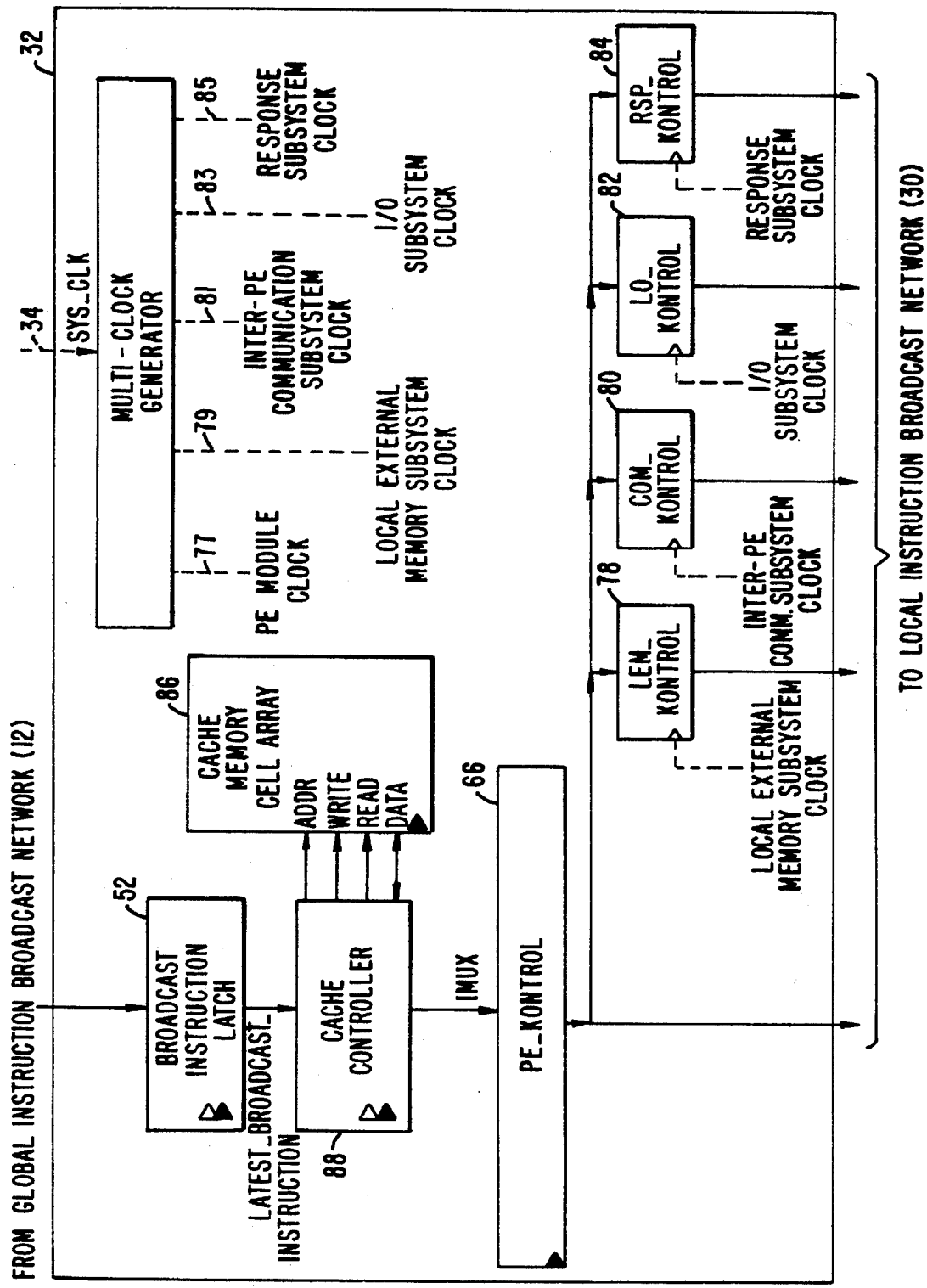
FIG. 8 depicts a particularization of a PE module local controller for an instruction-cache-enhanced multi-clock SIMD computer.

The sub-broadcast interval instruction sequencer 54 of the multi-clock SIMD local controller shown in FIG. 6 is replaced in an instruction-cache-enhanced local controller by a cache controller 88 and a cache memory cell array 86 as shown in FIG. 8. In this embodiment, the cache memory cell array 86 is realized using memory cells similar to those used for PE register memory 48 shown in FIG. 3 and in FIG. 4. The cache controller 88 is a superset of the sub-broadcast interval instruction sequencer 54. The cache controller 88 selects the instruction driven into the local instruction broadcast network 30 on every cycle of the PE module clock 77.

Under instruction cache-enhancement, instructions broadcast globally from the system controller 10 specify cache-control instructions in addition to the generic SIMD repertoire of instructions. The cache control instructions follow a cache control protocol to store program blocks in cache and to subsequently activate them. A variety of cache designs are possible, each specifying a particular cache-control protocol.

Each cache design specifies how blocks are delimited in cache. For example, designated cache-control instructions may be placed into cache to delimit cache blocks. Alternatively, the blocks may be explicitly delimited upon activation. Loops may or may not be unrolled when cached, subject to the details of a given cache design. A cache block does not necessarily correspond to an entire loop or subroutine body appearing in a program; some cache designs can profitably cache subsequences of program blocks. A particular cache design may allow multiple entries or multiple exits for a given block to facilitate a compact representation in cache.

A cache control instruction in a globally broadcast instruction alerts the cache controller 88 to begin to store a block at a specified address in the cache memory cell array 86. This cache control instruction may also specify the length of that cache block.

A cache block is said to be activated when the instructions it contains are begun to be read from the cache memory cell array via the data port. A cache block is activated by a globally broadcast instruction specifying the parameters required for its execution, possibly including initial and final cache addresses and iteration count. Some cache designs provide mechanisms that allow cache blocks to activate one another with varying degrees of generality.

The cache memory cell array 86 may have one port or two ports. With a two-ported cache memory, instructions for the PEs are retrieved through one port while the other port is used concurrently to pre-store, or prefetch, instructions that will subsequently be needed. Prefetching is a natural use for the global instruction broadcast network 12, which is otherwise idle when the local controller is executing a cache block. Prefetching into a SIMD instruction cache is of maximum benefit when the control flow of the program is statically predictable.

A cache might be able to contain only a single cache block (of variable length up to some maximum) at a time. A more complicated cache is able to contain a larger number of coresident cache blocks.

A cache controller might be able to execute only a single pass of an activated cache block. A more complicated cache controller is capable of executing a broadcast-instruction-specified number of iterations of an activated cache block.

A cache controller may be capable of interpreting cached instructions that initiate execution of other cache blocks. A cache controller capable of nesting cache blocks requires a flexible sequencer similar to that in a typical system controller 10.

The decision as to which blocks are to be to placed where in the cache, as well as when to put them there and when to activate them, are all explicit in the globally broadcast instructions. These decisions may be made statically, by the programmer of the compiler, or they may be made dynamically in the system controller. In any event, the cache memory locations occupied by a cache block are represented explicitly in the program running on the system controller.

In one embodiment of this invention, an instruction sequence is stored into the SIMD instruction cache from globally broadcast instructions at the rate of the system clock 34. A cache block is subsequently retrieved from cache at the relatively high rate of the PE module clock 77.

Figure 9:
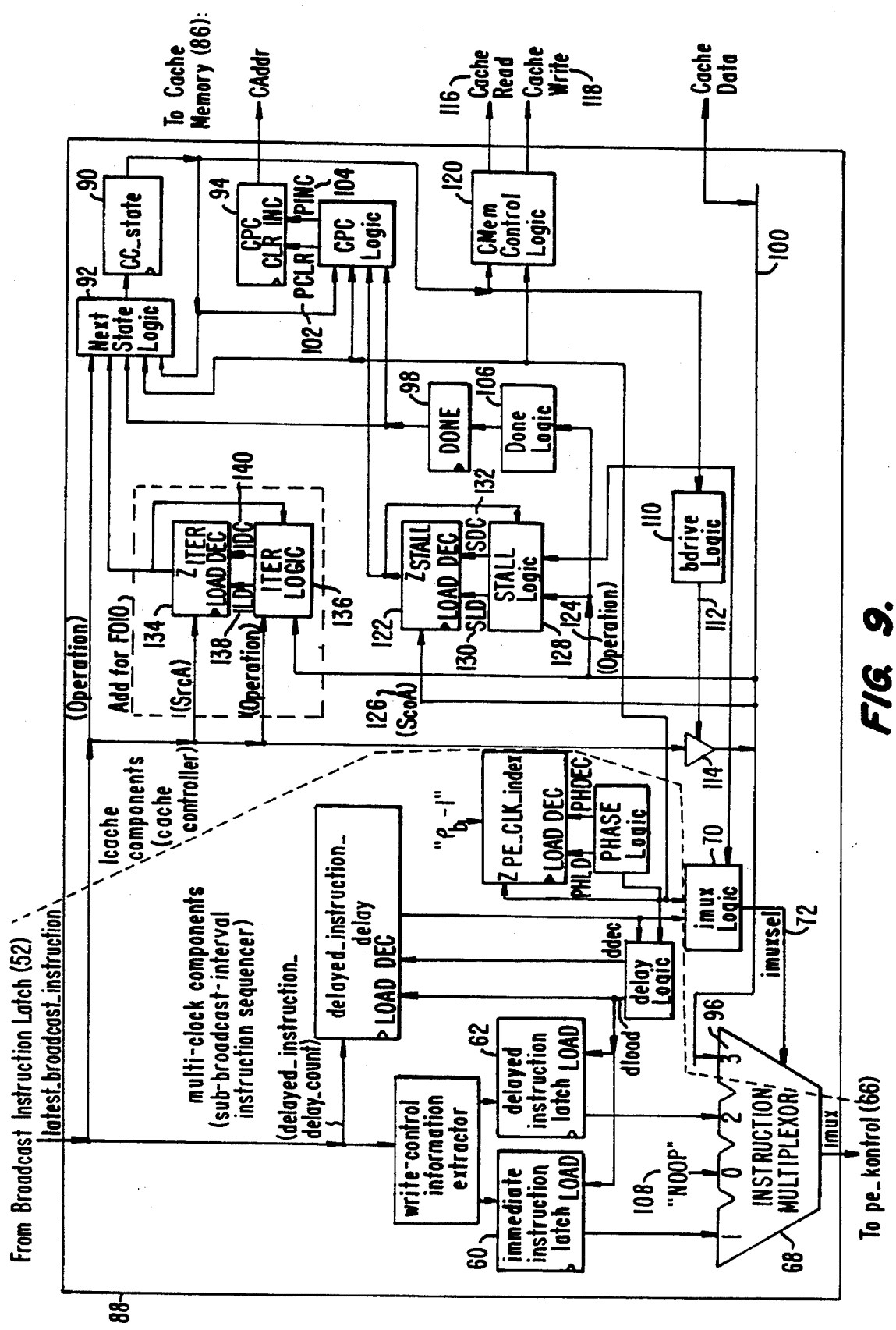
FIG. 9 depicts two particular cache controllers ($F_{000}$ and $F_{010}$)

Embodiments of two related cache controllers 88 of FIG. 8 are shown in FIG. 9. The CC_state register 90 of FIG. 9, in conjunction with the next state Logic block 92, comprises a state machine which realizes a control automaton of the cache. As an example of one such automaton, the state transition diagram of FIG. 10 describes the control automaton of a simple single-port cache that is capable of storing a single cache block at a time that is activated only for single iterations.

Figure 10:
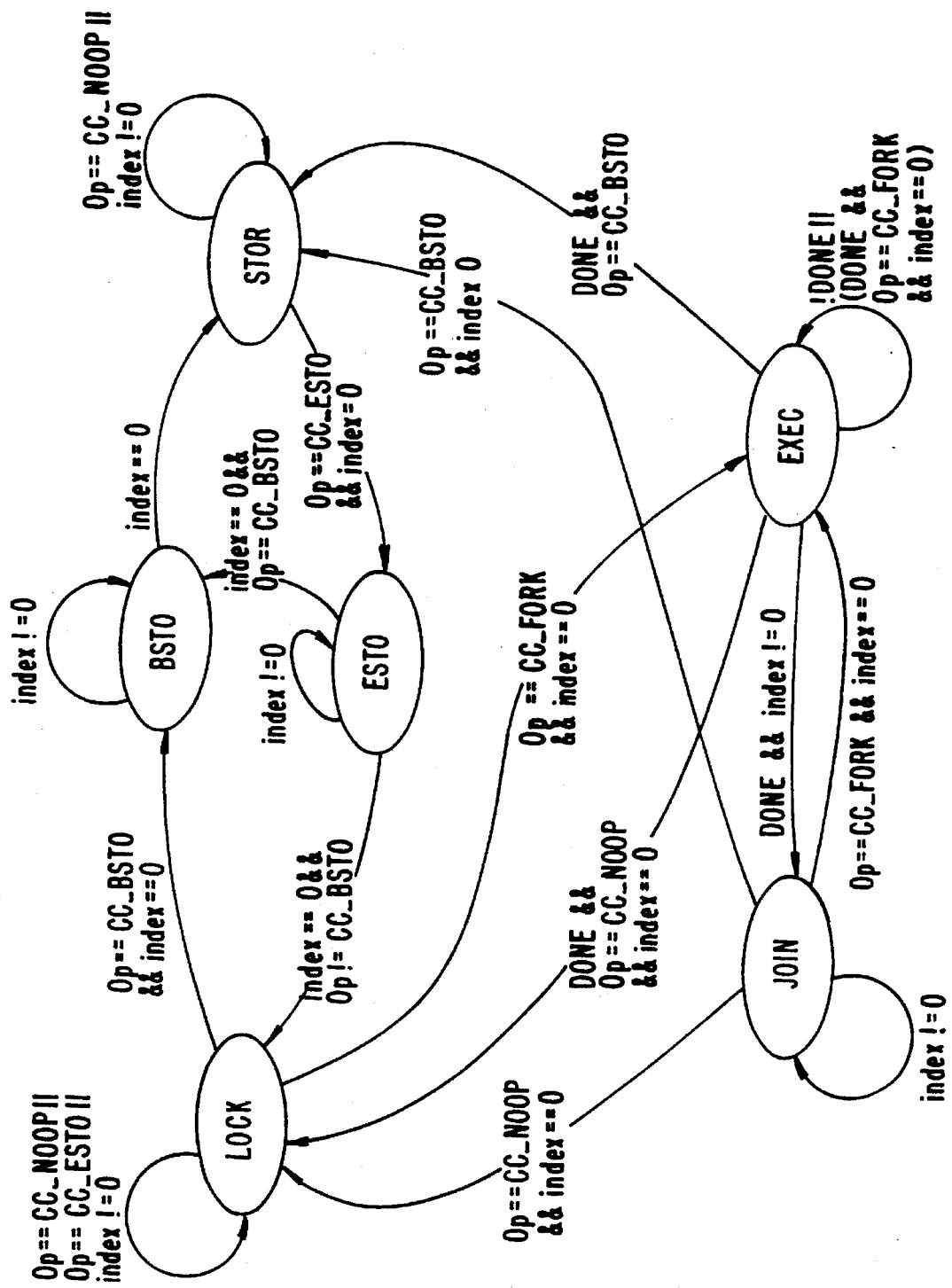
FIG. 10 depicts the state transition diagram for the $F_{000}$ cache controller of FIG. 9.

On each cycle of PE module clock 77, a cache controller implementing the control automaton described in FIG. 10 may be in one of six states:

LOCK: Instructions are being executed from the instruction broadcast network. For every instruction received from the global instruction broadcast network 12 while in the LOCK state, the cache controller copies that instruction to the local instruction broadcast network 30. On every successive cycle of PE module clock 77 until the next globally broadcast instruction arrives at the PE module, the cache controller drives a null instruction (NOOP) to the local instruction broadcast network. In this state, the Icache cache-enhanced enhanced local control function is identical to that previously described for the multi-clock local controller.

BSTO: The next broadcast instruction will be the first of the next cache block to be stored.

STOR: Globally broadcast instructions are being stored in consecutive cache memory locations. The cache controller supplies a null instruction to the local instruction broadcast network on every cycle of PE module clock 77 while in the STOR state. Since no useful instructions are executed in this state, cycles spent in the STOR state add to the overall cycle count of a SIMD computation.

ESTO: The current broadcast instruction will be the last one to be stored in cache for the cache block currently being stored.

EXEC: Instructions are being executed from cache. The cache controller supplies an instruction from cache on every cycle of PE module clock 77 in this state, so the computation rate in the EXEC state may exceed that of a stock SIMD computer by the maximum factor.

JOIN: Execution of a cache block has completed, but the next globally broadcast instruction has not yet arrived at the PE module. The cache controller supplies a null instruction to the local instruction broadcast network 30 on every cycle of PE module clock 77 while in the JOIN state.

At power up, the cache controller is in the LOCK state. FIG. 10 shows the allowed state transitions of the $F_{000}$ class of cache controller. (The nomenclature of $F_{000}$ to designate a class of cache controllers is explained later in the specification.)

In one embodiment, as depicted in FIG. 9, the CC_state register 90 represents the current state of the cache controller. There are six cache states, so CC_state is a 3-bit register. CPC 94 is the cache program counter, a clearable counter which contains the current cache memory address. The instruction multiplexor 68, modified for cache enhancement of the multi-clock local controller, comprises an additional input to the instruction mulitplexor shown as input 96 in FIG. 9, so that the cache memory may provide instructions to the pe_kontrol register 40 from the cache data bus 100. The end of an instruction sequence in cache has been encountered when the Operation field on the cache data bus 100 specifies an End of Routine (ESTO FIG. 10). The done bit-register 98 is then set, indicating that the end of a cache block has been reached.

In this emodiment, the multi-clock generator 35 of FIG. 6 and also of FIG. 8 generates clocks that are free-running. Also, the sub-broadcast interval instruction sequencer 54 of FIG. 6 and the cache controller 88 of FIG. 8 provide a new instruction for local broadcast within the PE module 26 on every cycle of PE module clock 77. In this arrangement, when there is no operation that may be specified in a given PE module clock cycle's instruction, a null instruction (also called a NOOP) is locally broadcast. In this arrangement, sequences of NOOPs represent time delays as arise, for example, when a high-latency MCS operation is outstanding while the program happens to specify no other operations to perform during that interval. (There exist alternative arrangements, using for example stoppable subsystem clocks, wherein sequences of NOOPs are not required to represent time delays.)

In the embodiments depicted in FIG. 9, the STALL down-counter 122 is a means to represent sequences of NOOPs compactly in cache memory 86 using a single cache location. A globally broadcast instruction specifies a stall-encoded NOOP by associating a greater-than-zero source literal value with a NOOP operation code. This greater-than-zero source literal value is taken to be the total number of NOOPs represented by the single instruction.

A stall-encoded NOOP causes the cache program counter CPC 94 to retain its value for a number of successive PE clock cycles equal to the greater-than-zero source literal value associated with the NOOP operation code in the globally broadcast instruction specifying the stall-encoded NOOP. The STALL logic block 128 in FIG. 9 generates the signals SLD 130 and SDC 132 that control STALL 122. These control signals are generated according the following table, wherein X is any value:

| CC_state | global broadcast operation | STALL | SLD | SDC |
|---|---|---|---|---|
| EXEC | NOOP | 0 | 1 | 0 |
|  | X | > 0 | 0 | 1 |
| not EXEC | X | X | 0 | 0 |

The CPC Logic block 94 in FIG. 9 generates PCLR 102 and PINC 104 signals to control the clearing and incrementing, respectively of CPC as depicted in the following table, wherein X is any value:

| CC_state | PE_CLK_index | DONE | STALL | PCLR | PINC |
|---|---|---|---|---|---|
| LOCK | X | X | X | 0 | 0 |
| BSTO | X | X | X | 1 | 0 |
| STOR | not 0 | X | X | 0 | 0 |
|  | 0 | X | X | 0 | 1 |
| ESTO | X | X | X | 1 | 0 |
| EXEC | X | 0 | 0 | 0 | 1 |
|  | X | 0 | > 0 | 0 | 0 |
|  | X | 1 | X | 1 | 0 |
| JOIN | X | X | X | 0 | 0 |

The DONE logic block 106 in FIG. 9 generates the input bit to the single-bit DONE register 98. The value stored into DONE is a 1 exactly when the instruction on the Cache Data bus 100 specifies an ESTO (End STOring) operation.

FIG. 8 indicates that the cache controller 88 generates the instruction to be delivered to the local instruction broadcast network 30 via the pe_kontrol latch 66 on each cycle of PE module clock 77. The IMUX logic block 70 in FIG. 9 selects that instruction from one of four sources; an explicit NOOP 108, contents of the immediate instruction latch 60, contents of the delayed instruction latch 62, the cache data bus input 96 driven from cache data bus 100. IMUX logic 70 controls the instruction multiplexor 68 by generating the signal imuxsel 72 using the logic as depicted in the following table, wherein X is any value:

| CC_state | PE_CLK_index | delayed_instruction_delay | imuxsel |
|---|---|---|---|
| LOCK | X | 0 | 2 |
|  | 0 | X | 1 |
|  | not 0 | X | 0 |
| BSTO | X | X | 1 |
| STOR | X | X | 0 |
| ESTO | X | X | 0 |
| EXEC | X | X | 3 |
| JOIN | X | X | 0 |

The bdrive logic block 110 generates the signal drive_broadcast_instruction_to_cache_data_bus 112 that controls the driver 114 to cause the most recently received broadcast instruction to be copied to the cache data bus 100. drive_broadcast_instruction_to_cache_data_bus 112 is asserted whenever the cache control state represented in CC_state 90 is not EXEC.

The cache program counter CPC 94 provides an address directly to cache memory 86. The cache memory data port is connected to the cache data bus 100 in the cache controller 88. The cache memory control signals cache read 116 and cache write 118 are derived in the CMem Control logic block 120. The values of signals cache read 116 and cache write 118 are derived using the function described in the following table, wherein X is any value:

| CC_state | PE_CLK_index | cache read | cache write |
|---|---|---|---|
| LOCK | X | 0 | 0 |
| BSTO | X | 0 | 0 |
| STOR | not 0 | 0 | 0 |
|  | 0 | 0 | 1 |
| ESTO | X | 0 | 1 |
| EXEC | X | 1 | 0 |
| JOIN | X | 0 | 0 |

A cache design specifies a collection of cache controller 88 functions and therefore induces a cache control protocol for activation of those functions supplying appropriate parameters. The size of a cache, that is, the total number of instructions it contains, is a parameter of any cache memory 86 that is not considered a parameter of the cache design itself, which is considered in this embodiment to focus on the cache controller 88. The cache control protocol is a set of functions that a corresponding cache controller implements and of the two caches described, referred to herein as $F_{000}$ and $F_{010}$, in accord with the taxonomy described above. The details disclosed above relate to an embodiment of an $F_{000}$ cache, the simplest member of the taxonomy. An $F_{010}$ cache implements a superset of the protocol implemented by an $F_{000}$ cache.

An $F_{000}$ cache is referred to herein as a "one-block one-shot" cache, indicating that only a single cache block may be present in the cache at a given time, and the sequence of instructions in the cache block is executed singly, without iteration. (Multiple executions of a cache block are accomplished by the system controller 10 providing multiple successive globally broadcast instructions, each of which specifies an execution of the cache block.)

An $F_{000}$ cache control protocol includes the following four cache control operations:

Cache-Control NOOP (CCANOOP): no cache control operation.

Begin Storing (BSTO): the broadcast instruction following this operation is the first in a sequence to be stored in the instruction cache, which is stored at address 0, with subsequent instructions stored to subsequent cache locations;

End Storing (ESTO): the present instruction is the last in the sequence stored in cache and, as stored in cache, delimits the end of the cache block in cache;

Begin Executing Cache Block (FORK): execute the cache block previously stored in cache.

A received globally broadcast instruction whose specified operation is not one of the above is deemed to be a CC_NOOP with respect to the cache-control protocol.

An $F_{010}$ cache implements a superset of the cache control protocol for an $F_{000}$ cache wherein multiple iterations of a cache block may be specified in a single globally broadcast instruction. An $F_{010}$ cache control protocol is identical to that of an $F_{000}$ cache, with the addition of a paramter to the FORK operation specifying the number of iterations of the cache block to be performed.

As depicted in FIG. 9, an $F_{010}$ cache is obtained from an $F_{000}$ cache by including an ITER down-counter 134 and an associated ITER logic block 136.

The value in the ITER down counter indicates the number of iterations of a FORK'd cache block remaining since its activation. The total number of iterations of a cache block is one (1) more than the parameter value supplied in the globally broadcast instruction specifying the cache block's activation. The ITER logic block 136 in FIG. 9 generates signals ILD 138 and IDC 140 that control ITER 134. These control signals are generated according to the following table, wherein X is any value:

| Operation specified in latest globally broadcast instruction | Operation specified in instruction on cache data 100 | ITER | ILD | IDC |
|---|---|---|---|---|
| FORK | not ESTO | X | 1 | 0 |
| not FORK | ESTO | >0 | 0 | 1 |
| not FORK | ESTO | 0 | 0 | 0 |
| FORK | ESTO | 0 | 1 | 0 |
| FORK | ESTO | >0 | 0 | 1 |
| not FORK | not ESTO | X | 0 | 0 |

The invention as disclosed herein is applicable to any VLSI SIMD computer architecture. Upon reading these detailed descriptions of embodiments of the invention, it will be apparent to the person skilled in the art that the invention increases throughput and/or throughput-to-area ratio of any VLSI SIMD computer architecture.

What is claimed is:

1. A multi-clock single-instruction stream, multiple-data stream (SIMD) computer comprising:
a global instruction broadcast subsystem regulated by a system clock signal oscillating at a system clock rate;
a multi-chip subsystem (MCS) regulated by second clock signal; and
a processing element (PE) module coupled to said global instruction broadcast subsystem and to said MCS, said PE module implemented on a single chip and including:
a first internal subsystem regulated by a third clock signal:
a second internal subsystem regulated by a fourth clock signal; and
a multi-clock generating circuit, responsive to said system clock signal, for generating a plurality of clock signals including said second, third, and fourth clock signals, wherein one of said third and fourth clock signals is a PE module clock signal oscillating at a PE module clock rate higher than said system clock, and wherein said second clock signal oscillates at a MCS clock rate higher than said system clock rate but no higher than said PE module clock rate.

2. A multi-clock SIMD computer comprising:
a globel instruction broadcast subsystem regulated by a system clock signal oscillating at a system clock rate;
an MCS regulated by a second clock signal; and
a PE module coupled to said global instruction broadcast subsystem and to said MCS, said PE module implemented on a single chip and including:
a first internal subsystem regulated by a third clock signal;
a second internal subsystem regulated by a fourth clock signal; and
a multi-clock generating circuit, responsive to said system clock signal, for generating a plurality of clock signals including said second, third, and fourth clock signals, wherein one of said third and fourth clock signals is a PE module clock signal oscillating at a PE module clock rate higher than said system clock, wherein said second internal subsystem includes a processing element (PE) that is regulated by a PE clock signal, and wherein said plurality of clock signals includes said PE clock signal oscillating at a PE clock rate higher than said system clock rate but no higher than said PE module clock rate.

3. A multi-clock SIMD computer comprising:
a global instruction broadcast subsystem regulated by a system clock signal oscillating at a system clock rate;
an MCS regulated by a second clock signal; and
a PE module coupled to said global instruction broadcast subsystem and to said MCS, said PE module implemented on a single chip and including:
a first internal subsystem regulated by a third clock signal;
a second internal subsystem regulated by a fourth clock signal; and
a multi-clock generating circuit, responsive to said system clock signal, for generating a plurality of clock signals including said second, third, and fourth clock signals, wherein said first clock signal oscillates at a rate different from one of said second, third, and fourth clock signals, and wherein said plurality of clock signals includes one clock signal oscillating in-phase with said system clock signal.

4. A multi-clock SIMD computer comprising:
a global instruction, broadcast subsystem regulated by a system clock signal oscillating at a system clock rate;
an MCS regulated by a second clock signal; and
a PE module coupled to said global instruction broadcast subsystem and to said MCS, said PE module implemented on a single chip and including:
a first internal subsystem regulated by a third clock signal;
a second internal subsystem regulated by a fourth clock signal: and
a multi-clock generating circuit, responsive to said system clock signal, for generating a plurality of clock signals including said second, third, and fourth clock signals. Wherein one of said third and fourth clock signals is a PE module clock signal oscillating at a PE module clock rate higher than said system clock, and wherein a first one of said plurality of clock signals may be restarted during any cycle of said PE module clock signal.

5. A multi-clock SIMD computer according to claim 4, wherein a second one of said plurality of clock signals generated by said multi-clock generating circuit is restartable in synchrony with said system clock signal.

6. A multi-clock SIMD computer comprising:
a global instructing broadcast subsystem regulated by a system clock signal oscillating at a system clock rate;
an MCS regulated by a second clock signal; and
a PE module coupled to said global instruction broadcast subsystem and to said MCS, said PE module implemented on a single chip and including:
a first internal subsystem regulated by a third clock signal;
a second internal subsystem regulated by a fourth clock signal; and
a multi-clock generating circuit, responsive to said system clock signal, for generating a plurality of clock signals including said second, third, and fourth clock signals, wherein one of said third and fourth clock signals is a PE module clock signal oscillating at a PE module clock rate higher than said system clock;
wherein said global instruction broadcast subsystem includes:
a system controller for providing a first sequence of instructions to said PE module; and
a global instruction broadcast network, coupled to said system controller, for broadcasting said first sequence of instructions from said system controller to said PE module at said system clock rate; and wherein said first internal subsystem is regulated by said PE module clock signal and includes a sub-broadcast-interval instruction sequencer, coupled to said global instruction broadcast network, for supplying said first sequence of instructions to said second internal subsystem at said PE module clock rate.

7. A multi-clock SIMD computer according to claim 6, wherein said first internal subsystem further comprises a memory for storing said first sequence of instructions provided by said global instruction broadcast subsystem.

8. A multi-clock SIMD computer according to claim 7, Wherein said first internal subsystem further comprises a memory controller for providing addresses and read/Write control signals to said memory responsive to the global instruction broadcast subsystem.

9. A multi-clock SIMD computer according to claim 8, wherein said memory controller is responsive to an instruction issued by said global instruction broadcast subsystem which directs said memory controller to write said first sequence of instructions subsequently broadcast over said global instruction broadcast network into said memory, and wherein said memory controller writes said first sequence of instructions into said memory at said system clock rate.

10. A multi-clock SIMD computer according to claim 8, wherein said memory controller is responsive to an instruction issued by said global instruction broadcast subsystem which directs said memory controller to cease writing said first sequence of instructions received from said global instruction broadcast network into said memory.

11. A multi-clock SIMD computer according to claim 8, wherein said memory controller is responsive to an instruction issued by said global instruction broadcast subsystem which directs said memory controller to retrieve said first sequence of instruction stored in said memory, wherein said memory controller retrieves said first sequence of instructions from said memory at said PE module clock rate.

12. A multi-clock SIMD computer according to claim 9, wherein said memory controller is responsive to a second instruction issued by said global instruction broadcast subsystem which directs said memory controller to write a predetermined number of instructions broadcast over said global instruction broadcast network into said memory.

13. A multi-clock SIMD computer according to claim 10, wherein said memory controller recognizes a second instruction issued by said global instruction broadcast subsystem to be a delimiter for said first sequence of instructions being written into said memory.

14. A multi-clock SIMD computer according to claim 11, wherein said memory controller is responsive to a second instruction issued by the global instruction broadcast subsystem which directs said memory controller to retrieve a predetermined number of instructions from said memory.

15. A multi-clock SIMD computer according to claim 11, wherein said memory controller is responsive to a second instruction issued by said global instruction broadcast subsystem which directs said memory controller to retrieve said first sequence of instructions from a predetermined address in said memory.

16. A multi-clock SIMD computer according to claim 11, wherein said memory controller is responsive to a second instruction issued by said global instruction broadcast subsystem which directs said memory controller to retrieve a predetermined number of iterations of said first sequence of instructions stored in said memory.

17. A multi-clock SIMD computer according to claim 15, wherein:

said memory includes said first sequence of instructions and a second sequence of instructions stored therein; and said memory controller is responsive to an instruction retrieved from said first sequence of instructions which directs said memory controller to jump to a predetermined address in said memory to retrieve said second sequence of instructions.

18. A multi-clock SIMD computer according to claim 8, wherein:

said memory comprises a first access port and a second access port; and wherein said memory controller concurrently reads a first sequence of instructions from said first port of said memory while writing a second sequence of instructions to said second port of said memory, 19. A multi-clock SIMD computer according to claim 11 wherein:

said memory controller is responsive to a second instruction issued by said global instruction broadcast subsystem which directs said memory controller to retrieve said first sequence of instructions from a predetermined address in said memory; and said memory controller is responsive to a third instruction issued by said global instruction broadcast subsystem which directs said memory controller to retrieve a predetermined number of iterations of said first sequence of instructions stored in said memory.

20. A processing element (PE) module for use in a multi-clock, single-instruction stream, multiple-data stream (SIMD) computer having a system controller, a global instruction broadcast network, and an inter-PE communication network (ICN), and being regulated by a system clock signal oscillating at a system clock rate, said PE module comprising:

a plurality of processing elements all regulated by a PE module clock signal;

a multi-chip subsystem (MCS) access controller, coupled to said plurality of processing elements, for selectively coupling said plurality of processing elements to said ICN, wherein said MCS access controller is regulated by said PE module clock signal;

a local controller coupled to said global instruction broadcast network, said local controller including:

an instruction decoder circuit, responsive to an instruction from said global instruction broadcast network, for generating a decoded instruction and an ICN control signal, wherein said instruction decoder circuit is regulated by said PE module clock signal;

an ICN control re-timer circuit, coupled to said instruction decoder circuit, for receiving said ICN control signal from said instruction decoder circuit and retransmitting Said ICN control signal to said MCS access controller, wherein said ICN control signal re-timer circuit is regulated by an ICN clock signal; and a multi-clock generator circuit, responsive to said system clock signal, for generating a plurality of clock signals, wherein said plurality of clock signals includes said PE module clock signal oscillating at a PE module clock rate and said ICN clock signal oscillating at a ICN clock rate, wherein said PE module clock rate and said ICN clock rate are no lower than said system clock rate; and a local instruction broadcast network, coupled to said local controller, said plurality of processing elements, and said MCS access controller, for transferring said decoded instruction from said local controller to said plurality of processing elements and said ICN control signal from said local controller to said MCS access controller.

21. A PE module as set forth in claim 20, wherein said instruction decoder circuit further comprises:

a receive-and-hold circuit that receives said instruction from said global instruction broadcast signal and holds said instruction until a new instruction is broadcast on the global instruction broadcast network;

a sub-broadcast interval instruction sequencer, coupled to said receive-and-hold circuit, for receiving said instruction in said receive-and-hold circuit and re-transmitting said instruction, wherein said sub-broadcast interval instruction sequencer is regulated by said PE module clock signal; and an instruction decoder, coupled to said sub-broadcast interval instruction sequencer, that generates a decoded instruction and an ICN control signal from said instruction.

22. A PE module as set forth in claim 21, wherein said ICN control signal generated by said instruction decoder circuit comprises an ICN control word, and wherein said ICN control re-timer circuit comprises an ICN control register for storing said ICN control word.

23. A PE module as set forth in claim 21, wherein said instruction decoder circuit further comprises:

a memory for storing a sequence of instructions transmitted over said .global instruction broadcast network; and a memory controller, coupled to said memory and to said receive-and-hold circuit, for retrieving said sequence of instructions stored in said memory, wherein said memory controller retrieves said sequence at said PE module clock rate responsive to an instruction held in said receive-and-hold circuit.

24. A multi-clock SIMD computer according to claim 17 wherein:

said memory controller is responsive to a third instruction issued by said global instruction broadcast subsystem which directs said memory controller to retrieve a predetermined number of iterations of said first sequence of instructions stored in said memory; and said memory controller is responsive to a fourth instruction issued by said global instruction broadcast subsystem which directs said memory controller to retrieve a predetermined number of iterations of said second sequence of instructions stored in said memory.

* * * * *

UNITED STATES PATENT AND TRADEMARK OFFICE
CERTIFICATE OF CORRECTION

PATENT NO. : 5,511,212

DATED : April 23, 1996

INVENTOR(S) : Todd E. Rockoff

It is certified that error appears in the above-indentified patent and that said Letters Patent is hereby corrected as shown below:

On the title page, showing the illustrative figure 6, and the drawing sheet consisting of Fig 6, should read as follows.

Sheet 4, Figure 6, Item 54, Change "SUB-BROADCAST-INTERVAL.INSTRUCTION SEQUENCER" to --SUB-BROADCAST-INTERVAL INSTRUCTION SEQUENCER--
Sheet 4, Figure 6, Item 78, Change "LEM KONTROL" to --LEM_KONTROL--
Sheet 4, Figure 6, Item 80, Change "COM KONTROL" to --COM_KONTROL--
Sheet 4, Figure 6, Item 82, Change "LO KONTROL" to --I/O_KONTROL--
Sheet 4, Figure 6, Item 84, Change "RSP KONTROL" to --RSP_KONTROL--

Col. 3, Line 15, Change "genetic" to --generic--

Col. 7, Line 52, Change "genetic" to --generic--

Col. 8, Line 32, Change "genetic" to --generic--
Col. 8, Line 40, Change "genetic" to --generic--
Col. 8, Line 43, Change "genetic" to --generic--

Col. 10, Line 66, Change "genetic" to --generic--

Col. 11, Line 57, Change "5" to --five--

UNITED STATES PATENT AND TRADEMARK OFFICE
CERTIFICATE OF CORRECTION

PATENT NO. : 5,511,212

DATED : April 23, 1996

INVENTOR(S) : Todd E. Rockoff

It is certified that error appears in the above-indentified patent and that said Letters Patent is hereby corrected as shown below:

Col. 12, Line 5, Change "genetic" to --generic--
Col. 12, Line 44, Change "Refering" to --referring--
Col. 12, Line 45, Change "$_\rho b$" to --$\rho b$--
Col. 12, Line 46, Change "$_\rho b$" to --$\rho b$--
Col. 12, Line 47, Change "index" to --INDEX--
Col. 12, Line 51, Change "PE_CLK_index" to --PE_CLK_INDEX--
Col. 12, Line 51, Change "$_\rho b$" to --$\rho b$--

Col. 13, Line 3, Change "delayed_instruction_delay to --DELAYED_INSTRUCTION_DELAY--
Col. 13, Line 4, Change "PE_CLK_index" to --PE_CLOCK_INDEX--
Col. 13, Line 13, Change "delayed_instruction_delay to --DELAYED_INSTRUCTION_DELAY--

Col. 14, Line 19, Change "genetic" to --generic--

Col. 16, Line 13, Change "16" to --sixteen--

Col. 22, Line 36, Change "(CCANOOP)" to --(CC_NOOP)--

UNITED STATES PATENT AND TRADEMARK OFFICE
CERTIFICATE OF CORRECTION

PATENT NO. : 5,511,212

DATED : April 23, 1996

INVENTOR(S) : Todd E. Rockoff

It is certified that error appears in the above-indentified patent and that said Letters Patent is hereby corrected as shown below:

Col. 23, Line 41, add --rate-- after "said system clock"
Col. 23, Line 46, Change "globel" to --global--
Col. 23, Line 61, add --rate-- after "said system clock"

Col. 24, Line 21, Delete the comma after "instruction"
Col. 24, Line 45, Change "instructing" to --instruction--

Col. 25, Line 14, Change "Wherein" to --wherein--
Col. 25, Line 15, Change "Write" to --write--
Col. 25, Line 35, Change "instruction" to --instructions--

Col. 26, Line 54, Change "Said" to --said--

Signed and Sealed this

Twenty-second Day of April, 1997

Attest:

BRUCE LEHMAN

Attesting Officer

Commissioner of Patents and Trademarks

Disclaimer 5,511,212—Todd E. Rockoff Eden Hills, Adelaide, Australia. MULTI-CLOCK SIMD COMPUTER AND INSTRUCTION-CACHE-ENHANCEMENT THEREOF. Patent dated April 23, 1996. Disclaimer filed January 22, 2003, by inventor.

Hereby enters this disclaimer to claims 1-24 of said patent.

*(Official Gazette, July 15, 2003)*